US007075592B2

(12) United States Patent
Morikawa

(10) Patent No.: US 7,075,592 B2
(45) Date of Patent: Jul. 11, 2006

(54) AUDIO SIGNAL ADJUSTING APPARATUS

(75) Inventor: Tadashi Morikawa, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 707 days.

(21) Appl. No.: 10/367,369

(22) Filed: Feb. 13, 2003

(65) Prior Publication Data

US 2003/0152236 A1 Aug. 14, 2003

(30) Foreign Application Priority Data

Feb. 14, 2002 (JP) ............................ 2002-037187

(51) Int. Cl.
*H04N 5/60* (2006.01)

(52) U.S. Cl. ......................... 348/738; 348/515; 381/17

(58) Field of Classification Search ................ 348/738, 348/515; 381/17–18, 310, 309, 74; 715/856, 715/727, 771, 764; H04N 5/60
See application file for complete search history.

(56) References Cited

U.S. PATENT DOCUMENTS 5,548,346 A * 8/1996 Mimura et al. ............. 348/738
5,590,094 A * 12/1996 Inanaga et al. ................ 369/4
5,760,825 A * 6/1998 Grenier .................... 348/14.07
6,829,018 B1 * 12/2004 Lin et al. .................... 348/738

FOREIGN PATENT DOCUMENTS

JP 2906539 4/1999

* cited by examiner

*Primary Examiner*—Trang Tran
(74) *Attorney, Agent, or Firm*—Pearne & Gordon LLP

(57) ABSTRACT

An audio signal adjusting apparatus for adjusting raw audio signals to produce adjusted audio signals, comprises an audio signal adjusting unit for adjusting the raw audio signals and operably connected with loudspeakers for producing audio sounds that collectively originated from an imaginary sound source. The imaginary sound source is imagined to produce the audio sounds at a location spaced apart from each of the loudspeakers. A controlling unit allows each of the raw audio signals to be adjusted in response to a location control signal indicative of the location of the imaginary sound source. A pointer image producing unit produces a pointer image indicative of the location of the imaginary sound source. A superimposing unit is designed to superimpose the pointer image on a portion of a screen image after receiving a video signal from a video signal producing unit in response to the location control signal.

28 Claims, 17 Drawing Sheets

FIG.14

| LOCATION INFORMATION ($d_0,\theta_0$) | LOCATION INFORMATION ($d_1,\theta_1$) | LOCATION INFORMATION ($d_2,\theta_2$) |
|---|---|---|
| (Rmax,0) | | |
| (Rmax,⊿θ) | | |
| (Rmax,⊿θ×2) | | |
| ... | | |
| (Rmax, 360°−⊿θ) | | |
| (Rmax−⊿R,0) | | |
| (Rmax−⊿R,⊿θ) | | |
| (Rmax−⊿R,⊿θ×2) | | |
| ... | | |
| (Rmax−⊿R, 360°−⊿θ) | | |
| (Rmax−⊿R×2,0) | | |
| (Rmax−⊿R×2,⊿θ) | | |
| (Rmax−⊿R×2,⊿θ×2) | | |
| ... | | |
| (Rmax−⊿R×2, 360°−⊿θ) | | |
| ... | | |
| (0,0) | | |

1400

▲ LOCATION INFORMATION ($d_0$, $\theta_0$)

● LOCATION INFORMATION ($d_1$, $\theta_1$)

■ LOCATION INFORMATION ($d_2$, $\theta_2$)

FIG.17
| | LOCATION INFORMATION $(d_0, \theta_0)$ | LOCATION INFORMATION $(d_1, \theta_1)$ | LOCATION INFORMATION $(d_2, \theta_2)$ |
|---|---|---|---|
| A | $(d_{0a}, \theta_{0a})$ | $(d_{1a}, \theta_{1a})$ | $(d_{2a}, \theta_{2a})$ |
| B | $(d_{0b}, \theta_{0b})$ | $(d_{1b}, \theta_{1b})$ | $(d_{2b}, \theta_{2b})$ |
| C | $(d_{0c}, \theta_{0c})$ | $(d_{1c}, \theta_{1c})$ | $(d_{2c}, \theta_{2c})$ |
| D | $(d_{0d}, \theta_{0d})$ | $(d_{1d}, \theta_{1d})$ | $(d_{2d}, \theta_{2d})$ |
1700
FIG.18
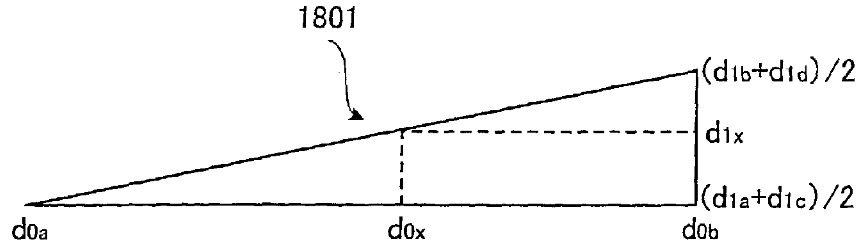
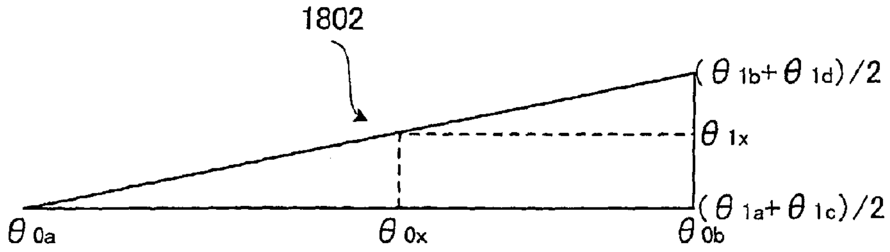

| WIDTH INFORMATION $w_0$ | WIDTH INFORMATION $w_1$ | WIDTH INFORMATION $w_2$ |
|---|---|---|
| Wmax | | |
| Wmax-$\Delta$w | | |
| Wmax-$\Delta$w×2 | | |
| ... | | |
| 0 | | |

1900

| | WIDTH INFORMATION $w_0$ | WIDTH INFORMATION $w_1$ | WIDTH INFORMATION $w_2$ |
|---|---|---|---|
| A | $w_{0a1}$ | $w_{1a1}$ | $w_{2a1}$ |
| A | $w_{0a2}$ | $w_{1a2}$ | $w_{2a2}$ |
| B | $w_{0b1}$ | $w_{1b1}$ | $w_{2b1}$ |
| B | $w_{0b2}$ | $w_{1b2}$ | $w_{2b2}$ |
| C | $w_{0c1}$ | $w_{1c1}$ | $w_{2c1}$ |
| C | $w_{0c2}$ | $w_{1c2}$ | $w_{2c2}$ |
| D | $w_{0d1}$ | $w_{1d1}$ | $w_{2b1}$ |
| D | $w_{0d2}$ | $w_{1d2}$ | $w_{2b2}$ |

2100

AUDIO SIGNAL ADJUSTING APPARATUS

BACKGROUND OF THE INVENTION

1. Field of the Invention

The present invention relates to an audio signal adjusting apparatus, and more particularly to an audio signal adjusting apparatus for adjusting a plurality of raw audio signals to produce a plurality of adjusted audio signals, and operably connected with a plurality of loudspeakers for respectively producing a plurality of audio sounds indicative of the adjusted audio signals in a specific sound space, the audio sounds being collectively originated from at least one imaginary sound source.

2. Description of the Related Art

Up until now, there have been provided a wide variety of audio signal adjusting apparatus of this type one typical example of which is shown in FIG. 24. The conventional audio signal adjusting apparatus of this type is disclosed in the Publication of Japanese Patent No. 2906539. and shown in FIG. 24. The conventional audio signal adjusting apparatus 10 is shown in FIG. 24 as comprising a receiving means 11 for receiving a plurality of raw audio signals, audio signals adjusting means 12 for adjusting the raw audio signals received by the receiving means 11 to produce a plurality of adjusted audio signals, a plurality of loudspeakers 13*a* and 13*b* for respectively producing a plurality of audio sounds indicative of the adjusted audio signals adjusted by the audio signals adjusting means 12 in a specific sound space, the audio sounds being collectively originated from at least one imaginary sound source, the imaginary sound source appearing to produce the audio sounds at the predetermined location, and controlling means 14 for controlling the audio signals adjusting means 12 to allow each of the raw audio signals to be adjusted by the audio signals adjusting means 12.

When the conventional audio signal adjusting apparatus 10 is operated by an operator to adjust the raw audio signals in association with a screen image displayed by a first display unit on a first screen, the operator must judge whether or not the imaginary sound source appears to produce the audio sounds at the predetermined location requested by the operator.

The conventional audio signal adjusting apparatus 10 may further comprise a second display unit having a second screen to display an screen image indicative of the predetermined location of the imaginary sound source on the second screen. The operator, therefore, may judge whether or not the imaginary sound source appears to produce the audio sounds at the predetermined location requested by the operator based on the screen image displayed by the second display unit on the second screen. The conventional audio signal adjusting apparatus 10 requires at least two different operations consisting of judging and watching operations by an operator. The operator must judge whether or not the imaginary sound source appears to produce the audio sounds at the location requested by the operator under the condition that the raw audio sounds are respectively produced by the previously mentioned conventional audio signal adjusting apparatus in the judging operation.

The operator is required to watch both the first and second screens on the former of which the screen image in association with the audio sounds is displayed by the first display unit and on the latter of which the location of the imaginary sound source is displayed by the second display unit in the watching operation. Furthermore, the operator finds it difficult to judge whether or not the imaginary sound source produces the audio sounds at the location requested by the operator under the condition that the raw audio sounds are respectively produced by the previously mentioned conventional audio signal adjusting apparatus while watching the first and second screens.

SUMMARY OF THE INVENTION

It is, therefore, an object of the present invention to provide an audio signal adjusting apparatus which can easily adjust the audio signals at a relatively high quality.

According to the first aspect of the present invention, there is provided an audio signal adjusting apparatus for respectively adjusting a plurality of raw audio signals each having a raw signal level to produce a plurality of adjusted audio signals each having an adjusted signal level, comprising: audio signal adjusting means for respectively adjusting the raw audio signals to produce the adjusted audio signals, and to be operably connected with a plurality of loudspeakers for respectively producing a plurality of audio sounds in a specific sound space, the audio sounds being respectively indicative of the adjusted audio signals, and collectively originated from at least one imaginary sound source having a width, the imaginary sound source being imagined to produce the audio sounds at a location spaced apart from each of the loudspeakers; location control signal producing means for producing a location control signal indicative of the location of the imaginary sound source; controlling means for controlling the audio signal adjusting means to allow each of the raw audio signals to be adjusted by the audio signal adjusting means in response to the location control signal produced by the location control signal producing means; pointer image producing means for producing a pointer image indicative of the location of the imaginary sound source; and superimposing means to be operably connected with video signal producing means for producing a video signal having a screen image having a portion in association with the location of the imaginary sound source, designed to superimpose the pointer image produced by the pointer image producing means on the portion of the screen image after receiving the video signal from the video signal producing means in response to the location control signal produced by the location control signal producing means, and to be operably connected with display means having a screen to display the screen image on the screen after receiving the video signal from the superimposing means.

According to the second aspect of the present invention, there is provided an audio signal adjusting apparatus for respectively adjusting a plurality of raw audio signals each having a raw signal level to produce a plurality of adjusted audio signals each having an adjusted signal level, comprising: a plurality of loudspeakers for respectively producing a plurality of audio sounds in a specific sound space, the audio sounds being respectively indicative of the adjusted audio signals, and collectively originated from at least one imaginary sound source having a width, the imaginary sound source being imagined to produce the audio sounds at a location spaced apart from each of the loudspeakers; location control signal producing means for producing a location control signal indicative of the location of the imaginary sound source; audio signal adjusting means for respectively adjusting the raw audio signals to produce the adjusted audio signal to be outputted to each of the loudspeakers; controlling means for controlling the audio signal adjusting means to allow each of the raw audio signals to be adjusted by the audio signal adjusting means in response to the location control signal produced by the location control signal producing means; a video signal input terminal having a video signal in association with each of the raw audio signals inputted therein, the video signal having a screen image, the screen image having a portion in association with the location of the imaginary sound source; display means having a screen to display the screen image on the screen after receiving the video signal from the video signal input terminal; pointer image producing means for producing a pointer image indicative of the location of the imaginary sound source; and superimposing means for superimposing the pointer image produced by the pointer image producing means on the portion of the screen image to be displayed by the display means on the screen in response to the location control signal produced by the location control signal producing means.

The audio signal adjusting apparatus may further comprise width control signal producing means for producing a width control signal indicative of the width of the imaginary sound source, the controlling means being operative to control the audio signal adjusting means to allow each of the raw audio signals to be adjusted by the audio signal adjusting means in response to each of the location control signal produced by the location control signal producing means and the width control signal produced by the width control signal producing means.

The audio signal adjusting apparatus may further comprise deciding means for deciding whether or not the pointer image produced by the pointer image producing means is superimposed by the superimposing means on the portion of the screen image to be displayed by the display means on the screen, the superimposing means being operative to superimpose the pointer image produced by the pointer image producing means on the portion of the screen image to be displayed by the display means on the screen based on results decided by the deciding means.

The audio signal adjusting apparatus may further comprise audio signal recording means operably connected with video signal recording means having an operation timing to record the video signal received through the video signal input terminal, and designed to record the adjusted audio signals adjusted by the audio signal adjusting means in synchronization with the operation timing of the video signal recording means.

The controlling means may include a control signal converting unit for respectively converting the location control signal produced by the location control signal producing means and the width control signal produced by the width control signal producing means to location information indicative of the location of the imaginary sound source and width information indicative of the width of the imaginary sound source, a signal level ratio producing unit for producing a signal level ratio of each of the adjusted signal levels of the adjusted audio signals to each of the raw signal levels of the raw audio signals based on the location information and the width information converted by the control signal converting unit, and a delay time information producing unit for producing delay time information with respect to a delay time for each of the raw audio signals based on the location information and the width information received from the control signal converting unit; and the audio signal adjusting means including a plurality of signal level adjusting unit for respectively adjusting the raw signal levels of the raw audio signals based on the signal level ratio of each of the adjusted signal levels of the adjusted audio signals to each of the raw signal levels of the raw audio signals produced by the signal level ratio producing unit, and a plurality of delay unit for respectively delaying the raw audio signals along a time axis in response to the delay time information produced by the delay time information producing unit.

The audio signal adjusting apparatus may further comprise a chart image producing means for producing a chart image indicative of the specific sound space having a predetermined central location and a first distance between the predetermined central location and the location of the imaginary sound source, the chart image having two different points consisting of first and second points, the first point being indicative of the predetermined central location of the specific sound space, the second point being indicative of the location of the imaginary sound source, and a second distance between the first point and the second point, the aid screen image to be displayed by the display means on the screen having a predetermined portion, the superimposing means being operative to superimpose the chart image produced by the chart image producing means on the predetermined portion of the screen image to be displayed by the display means on the screen in response to the location control signal produced by the location control signal producing means.

The chart image producing means may be operative to produce the chart image having a marker indicative of the imaginary sound source, the marker having a shape indicative of the width of the imaginary sound source.

The pointer image producing means may include a pointer image producing unit for producing the pointer image having a shape indicative of the width of the imaginary sound source and a pointer image modifying unit for modifying the shape of the pointer image produced by the pointer image producing unit in response to each of the location control signal produced by the location control signal producing means and the width control signal produced by the width control signal producing means; and the superimposing means being operative to superimpose the pointer image modified by the pointer image modifying unit on the portion of the screen image to be displayed by the display means on the screen.

The pointer image producing unit may be operative to produce the pointer image having a color in association with the location of the imaginary sound source; the pointer image modifying unit being operative to modify the color of the pointer image produced by the pointer image producing unit in response to the location control signal produced by the location control signal producing means; and the superimposing means being operative to superimpose the pointer image modified by the pointer image modifying unit on the portion of the screen image to be displayed by the display means on the screen.

The audio signal adjusting apparatus may further comprise first scale information producing means for producing a first scale information about an adjustment for the location control signal; storing means for storing the first scale information produced by the first scale information producing means; and judging means for judging whether or not the first scale information produced by the first scale information producing means are stored by the storing means, and the storing means being operative to store the first scale information produced by the first scale information producing means based on results judged by the judging means.

The audio signal adjusting apparatus may further comprise second scale information producing means for producing a second scale information about an adjustment for the width control signal; the storing means being store each of the first scale information produced by the first scale information producing means and the second scale information produced by the second scale information producing means, the judging means being operative to judge whether or not each of the first scale information produced by the first scale information producing means and the second scale information produced by the second scale information producing means is stored by the storing means; and the storing means being operative to store each of the first scale information produced by the first scale information producing means and the second scale information produced by the second scale information producing means based on results judged by the judging means.

The signal level ratio producing unit may be operative to produce the signal level ratio of each of the adjusted signal levels of the adjusted audio signals to each of the raw signal levels of the raw audio signals based on the location information and the width information received from the control signal converting unit; and the delay time information producing unit being operative to produce the delay time information with respect to the delay time for each of the raw audio signals based on the location information and the width information received from the control signal converting unit.

The pointer image producing unit may be operative to produce the pointer image based on the location information converted by the control signal converting unit, the width information converted by the control signal converting unit, and each of the first scale information and the second scale information stored by the storing means; and the chart image producing means being operative to produce the chart image based on the location information converted by the control signal converting unit, the width information converted by the control signal converting unit, and each of the first scale information and the second scale information stored by the storing means.

The first scale information producing means may be constituted by a first joystick unit having a joystick and an operation surface, the joystick having a central axis and a central point located on the central axis, and the joystick being pivotable around the central axis at a variable inclination angle between the central axis and the operation surface in association with first scale information, and the first joystick unit being operative to produce the first scale information in response to the inclination angle; the location control signal producing means being constituted by a second joystick unit having a joystick and an operation surface, the joystick having a central axis and a central point located on the central axis, and the joystick being pivotable around the central axis at a variable inclination angle between the central axis and the operation surface in association with the location of the imaginary sound source, and the first joystick unit being operative to produce the location control signal in response to the inclination angle; the pointer image producing means being operative to produce the pointer image through steps of producing the pointer image in response to the location control signal produced by the first joystick unit, and adjusting the pointer image in response to the first scale information produced by the joystick unit when the first scale information is produced by the first joystick unit under the condition that the joystick of the second joystick unit is disposed at a predetermined inclination angle; and the audio signal adjusting means being operative to adjust each of the raw audio signals to produce the adjusted audio signal to be outputted to each of the loudspeakers in response to each of the first scale information produced by the first joystick unit and the location control signal produced by the second joystick unit when the first scale information is produced by the first joystick unit under the condition that the joystick of the second joystick unit is disposed at a predetermined inclination angle.

The width control signal producing means may be constituted by a first potentiometer having a rotatable central axis, the first potentiometer being operative to produce the width control signal varied in response to a rotation angle of the central axis; the second scale information producing means being constituted by a second potentiometer having a rotatable central axis, the second potentiometer being operative to produce the second scale information varied in response to a rotation angle of the central axis; the pointer image producing means being operative to produce the pointer image through steps of producing the pointer image in response to the width control signal produced by the first potentiometer, and adjusting the pointer image in response to the second scale information produced by the second potentiometer when the second scale information is produced by the second potentiometer under the condition that the central axis of the first potentiometer is disposed at a predetermined rotation angle; and the audio signal adjusting means being operative to adjust each of the raw audio signals to produce the adjusted audio signal to be outputted to each of the loudspeakers in response to the second scale information produced by the second potentiometer when the second scale information is produced by the second potentiometer under the condition that the central axis of the first potentiometer is disposed at a predetermined rotation angle.

BRIEF DESCRIPTION OF THE DRAWINGS

The present invention and many of the attendant advantages thereof will be better understood from the following detailed description when considered in connection with the accompanying drawings, wherein:

FIG. 14 is a schematic diagram showing the database with respect to the location information stored by the storing means forming part of the audio signal adjusting apparatus according to the preferred embodiment of the present invention, FIG. 17 is a schematic diagram showing the database with respect to the location information stored by the storing means forming part of the audio signal adjusting apparatus according to the preferred embodiment of the present invention, FIG. 18 is a schematic diagram showing the location information which is produced by the control signal converting unit forming part of the audio signal adjusting apparatus according to the preferred embodiment of the present invention.

DESCRIPTION OF THE PREFERRED EMBODIMENTS

The following description will be directed to a preferred embodiment of the audio signal adjusting apparatus according to the present invention.

The preferred embodiment of the audio signal adjusting apparatus according to the present invention will now be described with reference to FIGS. 1 to 23.

The construction of the audio signal adjusting apparatus according to the preferred embodiment of the present invention will firstly be described.

Figure 1:
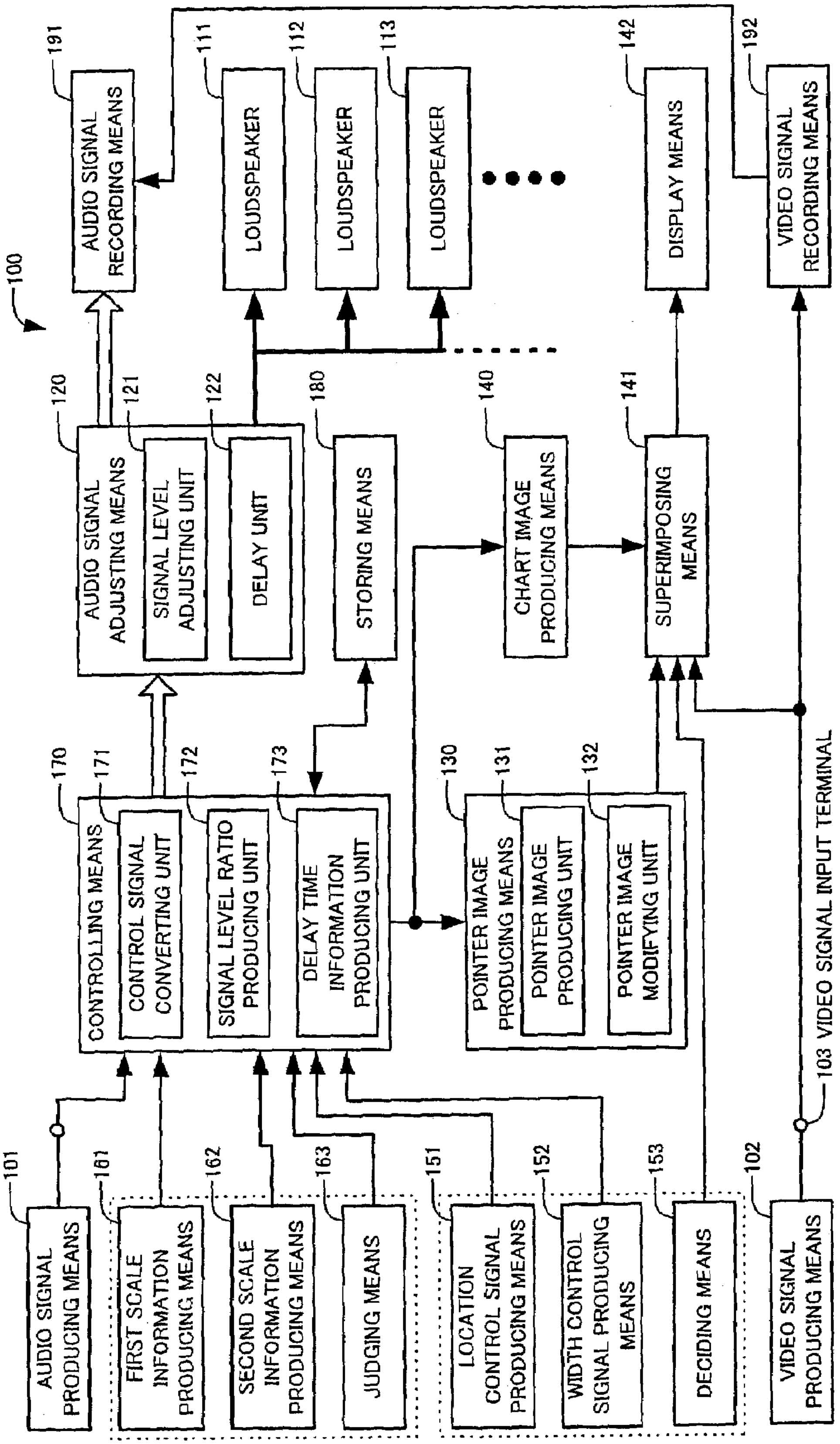
FIG. 1 is a block diagram of the audio signal adjusting apparatus according to the preferred embodiment of the present invention.

Referring to FIG. 1, there is shown an audio signal adjusting apparatus 100 for respectively adjusting a plurality of raw audio signals to produce a plurality of adjusted audio signals, each of the raw audio signals having an raw phase angle and an raw signal level, and each of the adjusted audio signals having an adjusted phase angle and an adjusted signal level.

The sound signal adjusting apparatus 100 is shown in FIG. 1 as comprising audio signal producing means 101 for producing a plurality of raw audio signals; a plurality of loudspeakers 111, 112, . . . , and 113 for respectively producing a plurality of audio sounds in a specific sound space, the audio sounds being respectively indicative of the adjusted audio signals, and collectively originated from at least one imaginary sound source having a width, the imaginary sound source being imagined to produce the audio sounds at a location spaced apart from each of the loudspeakers 111, 112, . . . , and 113; location control signal producing means 151 for producing a location control signal indicative of the location of the imaginary sound source; audio signal adjusting means 120 for adjusting each of the raw audio signals to produce the adjusted audio signal to be outputted to each of the loudspeakers; controlling means 170 for controlling the audio signal adjusting means 120 to allow each of the raw audio signals to be adjusted by the audio signal adjusting means 120 in response to the location control signal produced by the location control signal producing means 151; a video signal input terminal 103 having a video signal in association with each of the raw audio signals, the video signal having a screen image, the screen image having a portion in association with the location of the imaginary sound source; display means 142 having a screen 210 to display the screen image on the screen 210 after receiving the video signal from the video signal input terminal 103; pointer image producing means 130 for producing a pointer image indicative of the location of the imaginary sound source; and superimposing means 141 for superimposing the pointer image produced by the pointer image producing means 130 on the portion of the screen image to be displayed by the display means 142 on the screen in response to the location control signal produced by the location control signal producing means 151, audio signal recording means 191 operably connected with video signal recording means 192 having an operation timing to record the video signal produced by the video signal producing means 102, and designed to record the adjusted audio signals adjusted by the audio signal adjusting means 120 in synchronization with the operation timing of the video signal recording means 192.

Figure 2:
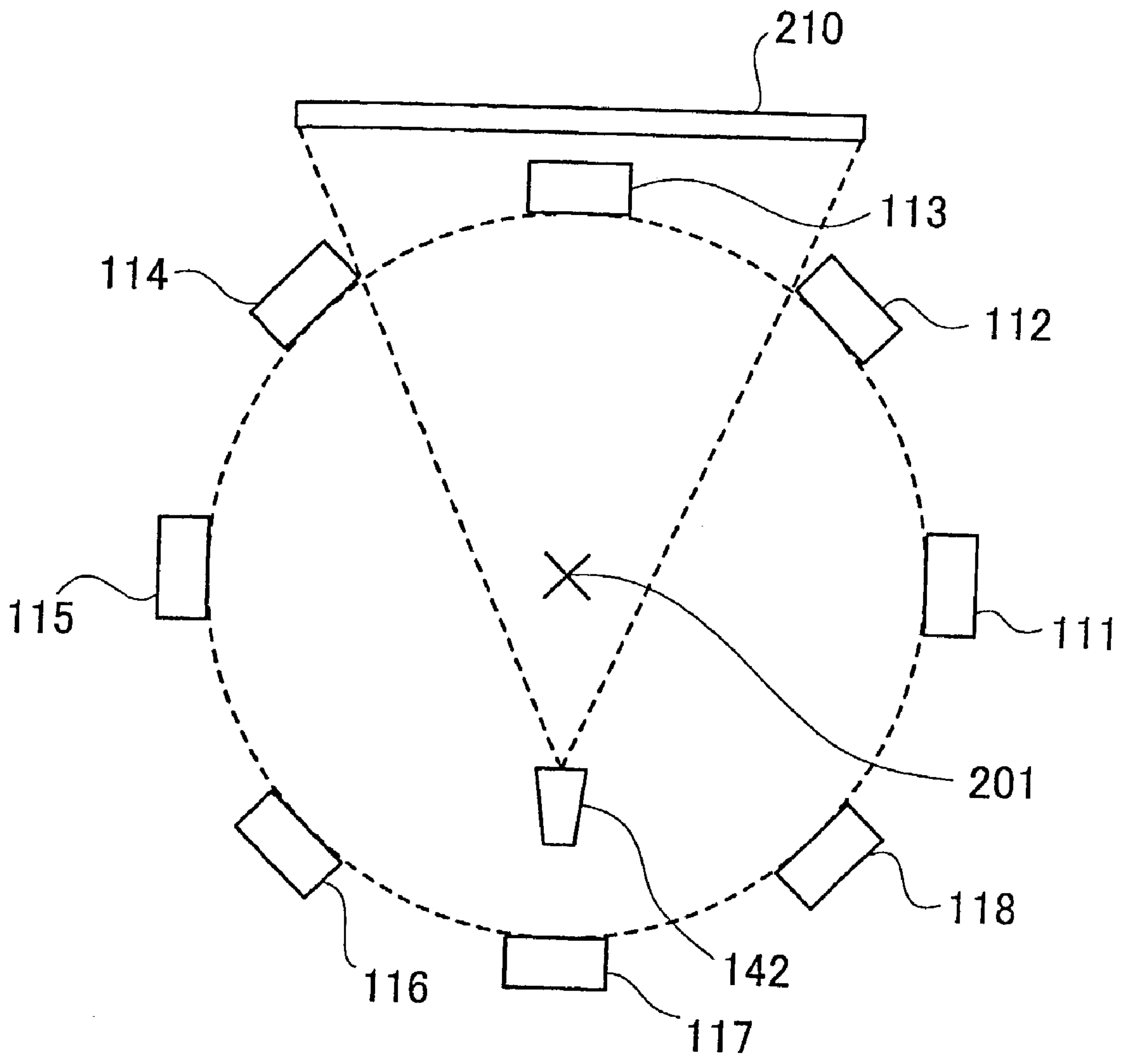
FIG. 2 is a plan view showing the loudspeakers forming part of the audio signal adjusting apparatus according to the preferred embodiment of the present invention, the loudspeakers being respectively disposed on a circumferential line of a predetermined circle in the specific sound space.

The loudspeakers 111, 112, . . . , and 113, as shown in FIG. 2, are respectively disposed on a circumferential line of a predetermined circle having a central location 201 in the specific sound space.

The image screen 210 has a predetermined location spaced apart from the central location 201. The display means 142 is constituted by a video projector to display the video image on the image screen 210.

The audio signal adjusting apparatus 100 further comprise width control signal producing means 161 for producing a width control signal indicative of the width of the imaginary sound source, the controlling means 170 being operative to control the audio signal adjusting means 120 to allow each of the raw audio signals to be adjusted by the audio signal adjusting means 120 in response to each of the location control signal produced by the location control signal producing means 151 and the width control signal produced by the width control signal producing means 161.

Figure 3:
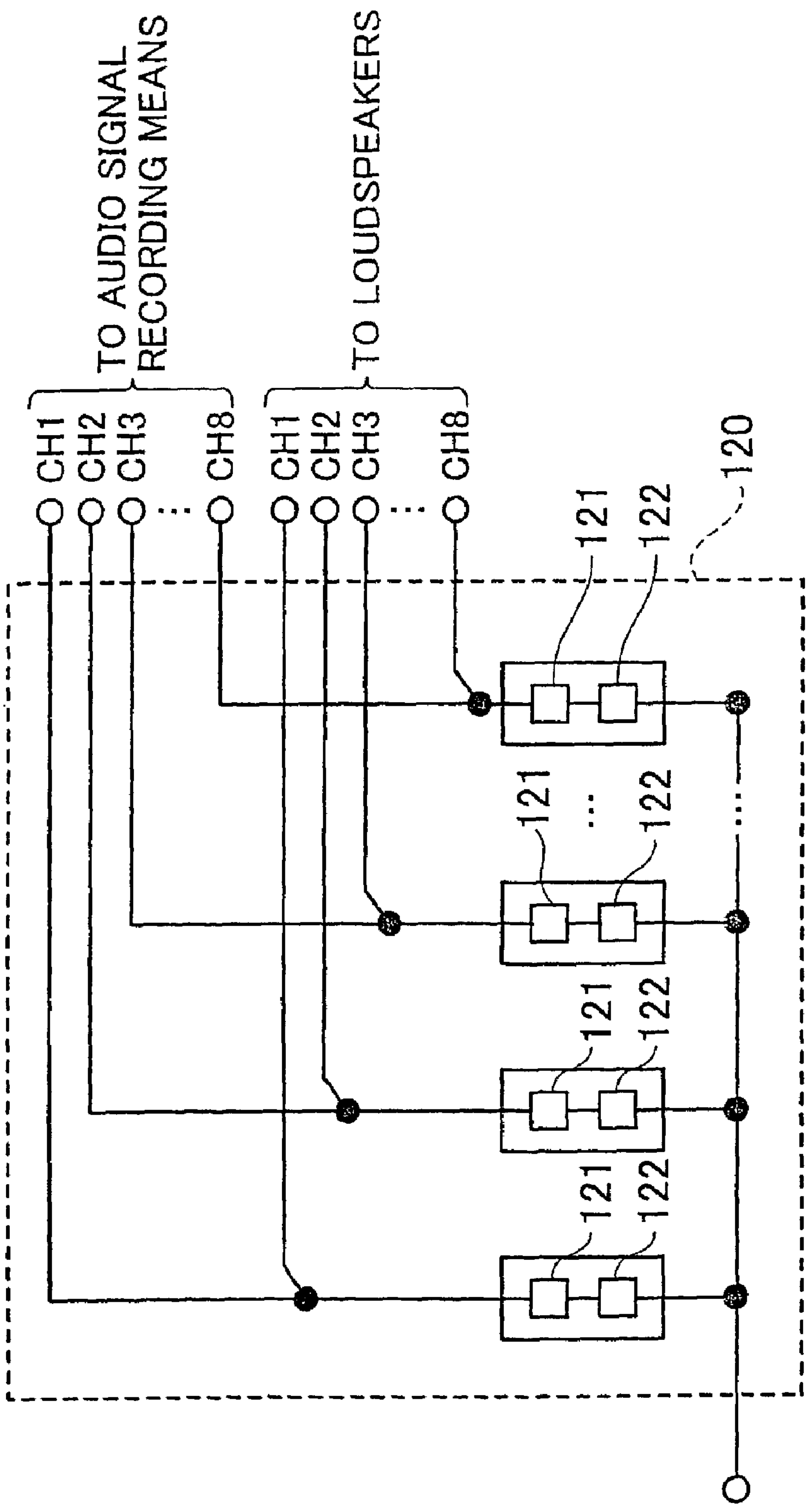
FIG. 3 is a block diagram of the audio signal adjusting means forming part of the audio signal adjusting apparatus according to the preferred embodiment of the present invention.

The audio signal adjusting means 120, as shown in FIG. 3, is operative to respectively adjust the raw audio signals to produce the adjusted audio signals, each of the raw audio signals having a raw phase angle and a raw signal level, each of the adjusted audio signals having an adjusted phase angle and an adjusted signal level; the controlling means 170 including an control signal converting unit 171 for respectively converting the location control signal produced by the location control signal producing means 151 and the width control signal produced by the width control signal producing means 152 to location information indicative of the location of the imaginary sound source and width information indicative of the width of the imaginary sound source, a signal level ratio producing unit 172 for producing a signal level ratio of each of the adjusted signal levels of the adjusted audio signals to each of the raw signal levels of the raw audio signals based on the location information and the width information converted by the control signal converting unit 171, and a delay time information producing unit 173 for producing delay time information with respect to a delay time for each of the raw audio signals based on the location information and the width information received from the control signal converting unit 170.

Figure 5:
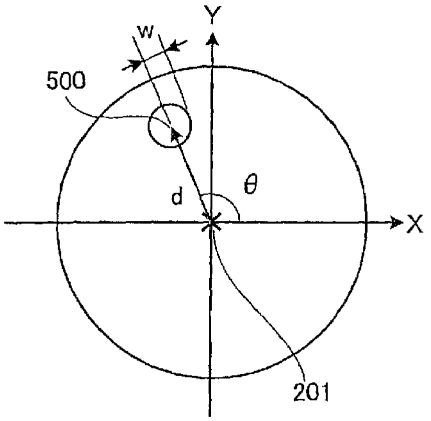
FIG. 5 is a schematic diagram showing the specific sound space in which the audio sounds are respectively produced by the loudspeakers each forming part of the audio signal adjusting apparatus according to the preferred embodiment of the present invention.

The control signal converting unit 171 is operative to respectively convert the location control signal produced by the location control signal producing means 151 and the width control signal produced by the width control signal producing means 152 to the location information (d, θ) indicative of the location of the imaginary sound source and the width information "w" indicative of the width of the imaginary sound source, the legend "d", as shown in FIG. 5, being indicative of a distance between the central location 201 of the specific sound space and the location of the imaginary sound source 500. The legend "θ" being indicative of a direction angle between first and second straight lines, the first straight line connecting the central location 201 of the specific sound space and the location of the imaginary sound source 500, the second straight line being indicative of a predetermined base line, for example, "x" axis.

The signal level ratio producing unit 172 is operative to produce the signal level ratio of each of the adjusted signal levels of the adjusted audio signals to each of the raw signal levels of the raw audio signals based on the location information (d, θ) converted by the control signal converting unit 171 and the width information "w" converted by the control signal converting unit 171.

The delay time information producing unit 173 is operative to produce delay time information with respect to a delay time for each of the raw audio signals based on the location information (d, θ) converted by the control signal converting unit 171 and the width information "w" converted by the control signal converting unit 171.

The audio signal adjusting means 120, as shown in FIG. 2, includes a plurality of signal level adjusting unit 121 for respectively adjusting the raw signal levels of the raw audio signals based on the signal level ratio of each of the adjusted signal levels of the adjusted audio signals to each of the raw signal levels of the raw audio signals produced by the signal level ratio producing unit 172, and a plurality of delay unit 122 for respectively delaying the raw audio signals along a time axis in response to the delay time information produced by the delay time information producing unit 173.

The audio signal adjusting apparatus 100 further comprises width control signal producing means 152 for producing a width control signal indicative of the width of the imaginary sound source and deciding means 153 for deciding whether or not the pointer image produced by the pointer image producing means 130 is superimposed by the superimposing means 141 on the portion of the screen image to be displayed by the display means 142 on the screen, the controlling means 170 being operative to control the audio signal adjusting means 120 to allow each of the raw audio signals to be adjusted by the audio signal adjusting means 120 in response to each of the location control signal produced by the location control signal producing means 151 and the width control signal produced by the width control signal producing means 152, and the superimposing means 141 being operative to superimpose the pointer image produced by the pointer image producing means 130 on the portion of the screen image to be displayed by the display means 142 on the screen based on results decided by the deciding means 153.

The audio signal adjusting apparatus 100 further comprises first scale information producing means 161 for producing a first scale information about an adjustment of the location control signal; second scale information producing means 162 for producing a second scale information about an adjustment of the width control signal; storing means 180 for storing each of the first scale information produced by the first scale information producing means 161 and the second scale information produced by the second scale information producing means 162; and judging means 163 for judging whether or not the first scale information produced by the first scale information producing means 161 are stored by the storing means 180, the storing means 180 being operative to store the first scale information produced by the first scale information producing means 161 based on results judged by the judging means 163.

The first scale information producing means 161 is constituted by a first joystick unit 161 having a joystick and an operation surface, the joystick having a central axis and a central point located on the central axis, and the joystick being pivotable around the central axis at a variable inclination angle between the central axis and the operation surface in association with first scale information, and the first joystick unit being operative to produce the first scale information in response to the inclination angle; the location control signal producing means 151 being constituted by a second joystick unit 151 having a joystick and an operation surface, the joystick having a central axis and a central point located on the central axis, and the joystick being pivotable around the central axis at a variable inclination angle between the central axis and the operation surface in association with the location of the imaginary sound source, and the first joystick unit 151 being operative to produce the location control signal in response to the inclination angle; the pointer image producing means 130 being operative to produce the pointer image through steps of producing the pointer image in response to the location control signal produced by the first joystick unit 151, and adjusting the pointer image in response to the first scale information produced by the first joystick unit 161 when the first scale information is produced by the first joystick unit 161 under the condition that the joystick of the second joystick unit 151 is disposed at a predetermined inclination angle; and the audio signal adjusting means 120 being operative to adjust each of the raw audio signals to produce the adjusted audio signal to be outputted to each of the loudspeakers 111, 112, and 113 in response to each of the first scale information produced by the first joystick unit 161 and the location control signal produced by the second joystick unit 151 when the first scale information is produced by the first joystick unit 161 under the condition that the joystick of the second joystick unit 151 is disposed at a predetermined inclination angle.

The width control signal producing means 152 is constituted by a first potentiometer 152 having a rotatable central axis, the first potentiometer 152 being operative to produce the width control signal varied in response to a rotation angle of the central axis; the second scale information producing means 162 being constituted by a second potentiometer 162 having a rotatable central axis, the second potentiometer 162 being operative to produce the second scale information varied in response to a rotation angle of the central axis; the pointer image producing means 130 being operative to produce the pointer image through steps of producing the pointer image in response to the width control signal produced by the first potentiometer 152, and adjusting the pointer image in response to the second scale information produced by the second potentiometer 162 when the second scale information is produced by the second potentiometer 162 under the condition that the central axis of the first potentiometer 152 is disposed at a predetermined rotation angle; and the audio signal adjusting means 120 being operative to adjust each of the raw audio signals to produce the adjusted audio signal to be outputted to each of the loudspeakers 111, 112, and 113 in response to the second scale information produced by the second potentiometer 162 when the second scale information is produced by the second potentiometer 162 under the condition that the central axis of the first potentiometer 152 is disposed at a predetermined rotation angle.

Figure 4:
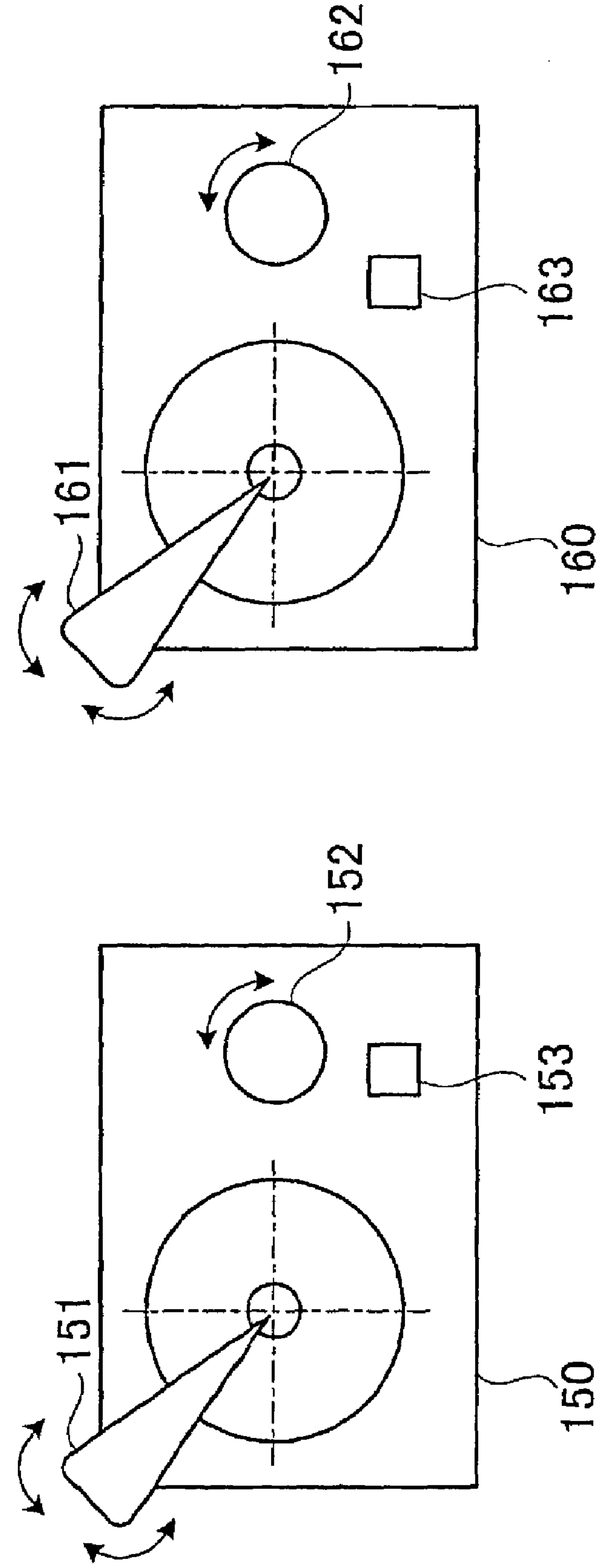
FIG. 4 is a plan view of the first control signal producing section and the second control signal producing section each forming part of the audio signal adjusting apparatus according to the preferred embodiment of the present invention.

The location control signal producing means 151, the width control signal producing means 152, and deciding means 153 are respectively constituted by the first joystick unit 151, the second potentiometer 152, and a first switch 153. The first joystick unit 151, the second potentiometer 152, and the first switch 153, as shown in FIG. 4, are collectively constitute a first inputting means 150.

The first scale information producing means 161, the second scale information producing means 162, and the judging means 163 are respectively constituted by the second joystick unit 161, the first potentiometer 162, and a second switch 163. The second joystick unit 161, the first potentiometer 162, and the second switch 163, as shown in FIG. 4, are collectively constitute a second inputting means 160. The first joystick unit 151 forming part of the first inputting means 150 is the same as the second joystick unit 161 forming part of second inputting means 160. The first controller 152 forming part of the first inputting means 150 is the same as the second controller 162 forming part of second inputting means 160.

Figure 6:
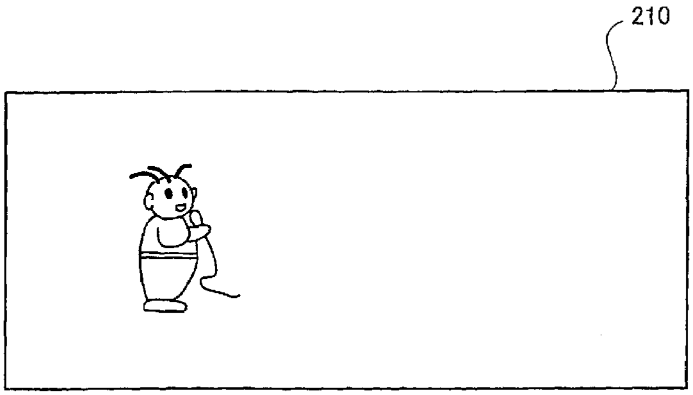
FIG. 6 is a schematic diagram showing the screen image which is displayed by the display means forming part of the audio signal adjusting apparatus according to the preferred embodiment of the present invention.

FIG. 6 shows the screen image displayed on the screen by the display means 142 forming part of the audio signals adjusting means 100 according to the preferred embodiment of the present invention. The display means 142, as shown in FIG. 6, is operative to display the screen image on the screen after receiving the video signal having the screen image from the video signal producing means 102 through the video signal input terminal 103.

The audio signal adjusting apparatus 100 further comprises a chart image producing means 140 for producing a chart image indicative of the specific sound space having a predetermined central location and a first distance between the predetermined central location and the location of the imaginary sound source, the chart image having two different points consisting of first and second points, the first point being indicative of the predetermined central location of the specific sound space, the second point being indicative of the location of the imaginary sound source, and a second distance between the first point and the second point, the screen image to be displayed by the display means 142 on the screen having a predetermined portion, the superimposing means 141 being operative to superimpose the chart image produced by the chart image producing means 140 on the predetermined portion of the screen image to be displayed by the display means 142 on the screen in response to the location control signal produced by the location control signal producing means 151.

Figure 8:
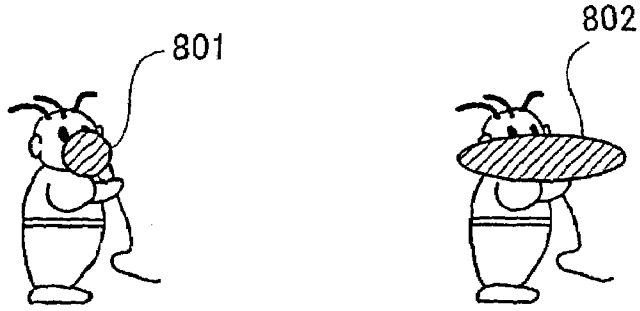
FIG. 8 is a schematic diagram showing the screen image on which the pointer image is superimposed by the superimposing means forming part of the audio signal adjusting apparatus according to the preferred embodiment of the present invention.

FIG. 8 is a schematic diagram showing the screen image on which the pointer image is superimposed by the superimposing means forming part of the audio signal adjusting apparatus according to the preferred embodiment of the present invention.

The pointer image producing means 130 includes a pointer image producing unit 131 for producing the pointer image having a shape indicative of the width of the imaginary sound source and a pointer image modifying unit 132 for modifying the shape of the pointer image produced by the pointer image producing unit 131 in response to each of the location control signal produced by the location control signal producing means 151 and the width control signal produced by the width control signal producing means 152; and the superimposing means 141, as shown in FIG. 8, being operative to superimpose the pointer image modified by the pointer image modifying unit 132 on the portion of the screen image to be displayed by the display means 142 on the screen 210.

The pointer image producing unit 131 is operative to produce the pointer image having a color in association with the location of the imaginary sound source; the pointer image modifying unit 132 being operative to modify the color of the pointer image produced by the pointer image producing unit 131 in response to the location control signal produced by the location control signal producing means 151; and the superimposing means 141 being operative to superimpose the pointer image modified by the pointer image modifying unit 132 on the portion of the screen image to be displayed by the display means 142 on the screen 210.

The pointer image producing unit 131 is operative to produce the pointer image based on the location information (d, θ) converted by the control signal converting unit 171, the width information "w" converted by the control signal converting unit 171, and each of the first scale information and the second scale information stored by the storing means 180; the chart image producing means 140 being operative to produce the chart image based on the location information converted by the control signal converting unit 171, the width information converted by the control signal converting unit 171, and each of the first scale information and the second scale information stored by the storing means 180.

Figure 7:
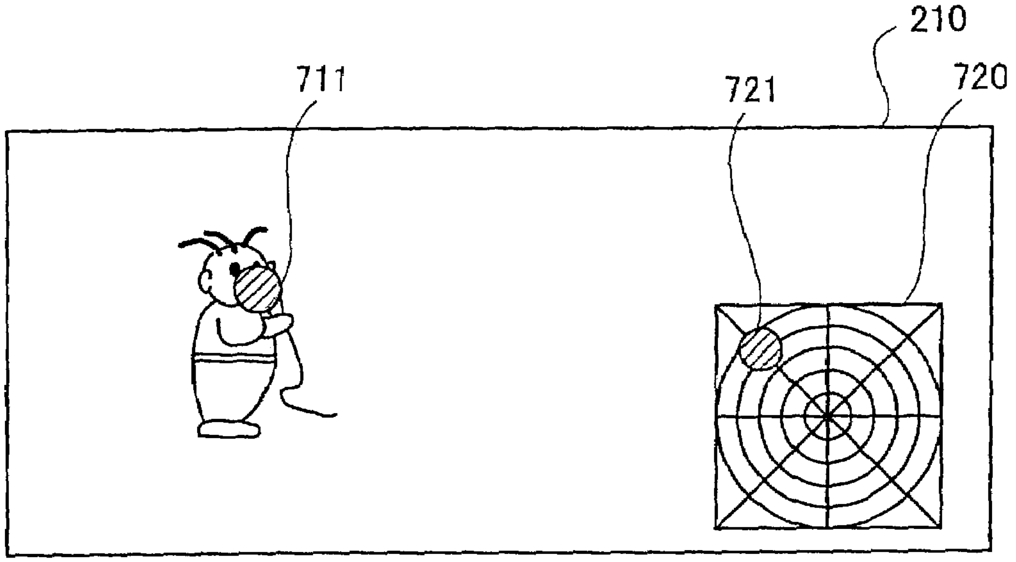
FIG. 7 is a schematic diagram showing the screen image on which each of the pointer image and the chart image is superimposed by the superimposing means forming part of the audio signal adjusting apparatus according to the preferred embodiment of the present invention.

FIG. 7 shows the screen image on which each of the pointer image 711 and the chart image 720 is superimposed by the superimposing means 141. The chart image 720, as shown in FIG. 7, has a radar chart indicative of the specific sound space, the radar chart having a circumferential line on which each of the loudspeakers 111, 112, . . . , and 113 is disposed, a plurality of concentric circles collectively having a common central point indicative of the predetermined central location of the specific sound space, a plurality of straight lines each extending to pass through the common central point of the concentric circles, and a marker indicative of the imaginary sound source, the marker having a source shape indicative of the width of the imaginary sound source, a source point indicative of the location of the imaginary sound source.

Figure 23:
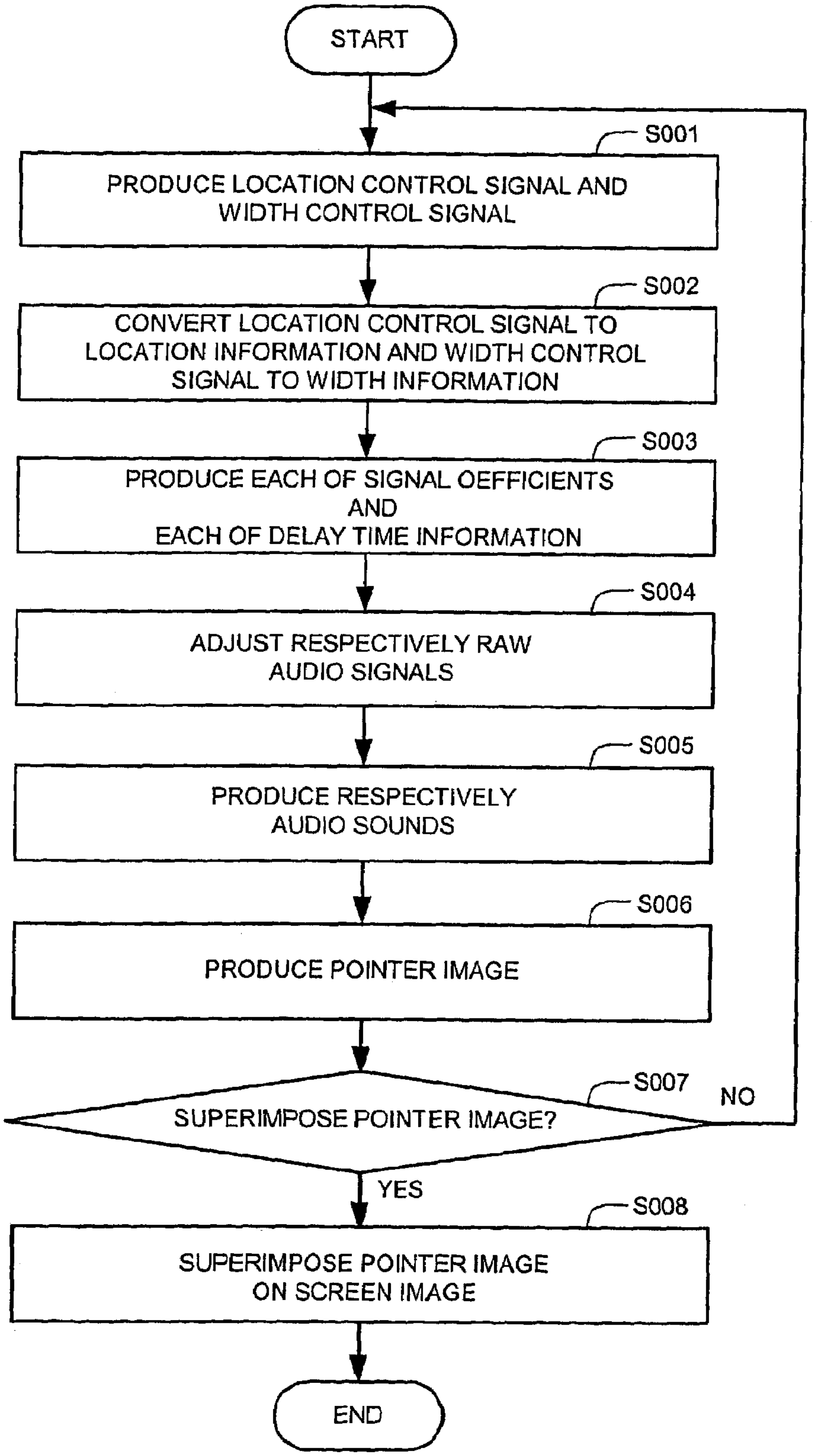
FIG. 23 is a flowchart showing the process performed by the audio signal adjusting apparatus according to the preferred embodiment of the present invention.
Figure 24:
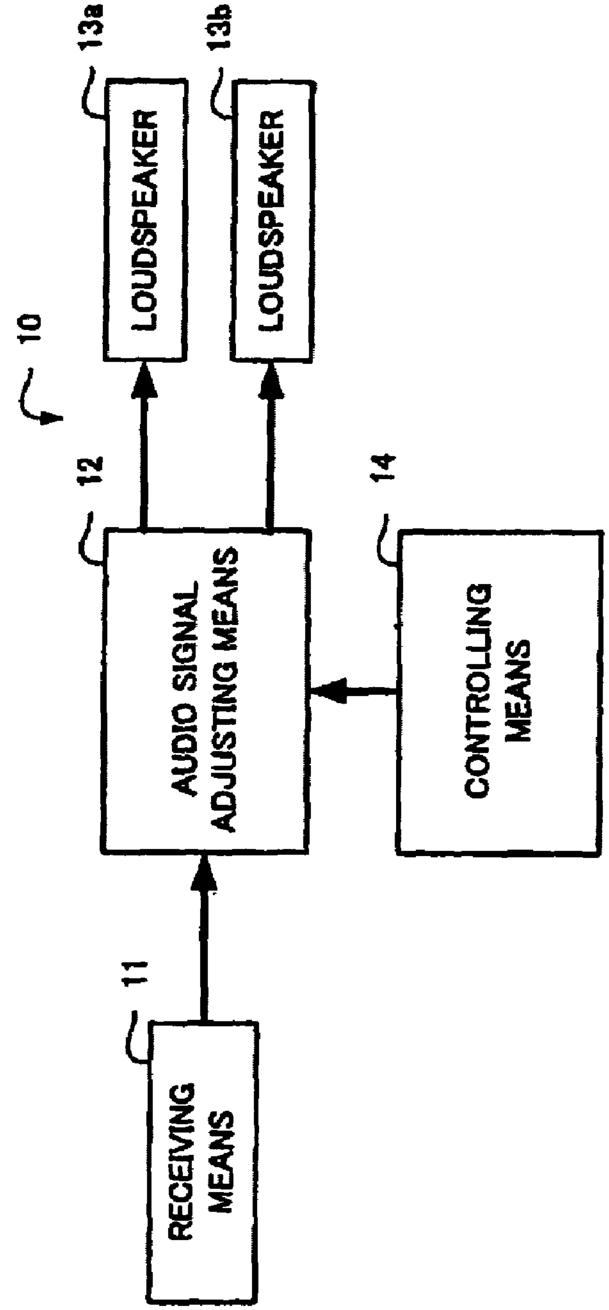
FIG. 24 PRIOR ART
FIG. 24 is a block diagram of the conventional audio signal adjusting apparatus.

The following description will be directed to a process performed by the audio signal adjusting apparatus 100 according to the preferred embodiment of the present invention with reference to FIG. 23.

The location control signal indicative of the location of the imaginary sound source and the width control signal indicative of the width of the imaginary sound source are firstly respectively produced by the location control signal producing means 151 and the width control signal producing means 152 in the step S001.

The location control signal produced by the location control signal producing means 151 and the width control signal produced by the width control signal producing means 152 are then respectively converted by the control signal converting unit 171 to location information (d, θ) indicative of the location of the imaginary sound source and width information "w" indicative of the width of the imaginary sound source in the step S002.

The signal level ratio of the adjusted signal level of each of the adjusted audio signals to the raw signal level of each of the raw audio signals (hereinafter referred to simply as "signal coefficients") and the delay time information for each of the raw audio signals are then respectively produced by the signal level ratio producing unit 172 and the delay time information producing unit 173 based on the location information and the width information converted by the control signal converting unit 171 in the step S003.

The raw signal levels of the raw audio signals are then respectively adjusted by each of the signal level adjusting units 121 and the delay unit 122 to produce the adjusted signal levels of the adjusted audio signals based on the signal coefficients produced by the signal level ratio producing unit 172 and delay time information for each of the raw audio signals delay time information producing unit 173 while the adjusted audio signals adjusted by the audio signal adjusting means 120 are respectively recorded by the audio signal recording means 191 in synchronization with the operation timing of the video signal recording means 192 in the step S004.

The audio sounds are then respectively produced by the loudspeakers 111, 112, . . . , and 113 in response to the adjusted audio signals adjusted by the audio signal adjusting means 120 in the step S005.

The pointer image indicative of the imaginary sound source is then produced by the pointer image producing unit 131 in response to each of the location information (d, θ) and width information "w" converted by the control signal converting unit 171, the color and the shape of the pointer image produced by the pointer image producing unit 131 being then respectively modified by the pointer image modifying unit 132 in response to each of the location information (d, θ) and width information "w" converted by the control signal converting unit 171. The chart image indicative of the specific sound space is then produced by the chart image producing means 140 in response to the location information (d, θ) converted by the control signal converting unit 171, the width information "w" converted by the control signal converting unit 171, and each of the first scale information and the second scale information stored by the storing means 180 in the step S006.

The decision is then made by the deciding unit 133 whether or not each of the pointer image produced by the pointer image producing unit 131 and the chart image produced by the chart image producing means 140 is superimposed by the superimposing means 141 on the predetermined portion of the screen image to be displayed by the display means 142 on the screen in the step S007. When the answer in the step S007 is the affirmative "YES", i.e., each of the pointer image produced by the pointer image producing unit 131 and the chart image produced by the chart image producing means 140 is superimposed by the superimposing means 141 on the predetermined portion of the screen image to be displayed by the display means 142 on the screen, the step S007 proceeds the step S008. When the answer in the step S007, on the other hand, is the negative "NO", i.e., each of the pointer image produced by the pointer image producing unit 131 and the chart image produced by the chart image producing means 140 is not superimposed by the superimposing means 141 on the predetermined portion of the screen image to be displayed by the display means 142 on the screen, the step S007 goes to the step S001.

The pointer image produced by the pointer image producing unit 131 and the chart image produced by the chart image producing means 140 are then respectively superimposed by the superimposing means 141 the screen image to be displayed by the display means 142 on the screen based on results decided by the deciding unit 133 in the step S008.

The following description will be directed to the step S003 performed by the audio signal adjusting apparatus 100 according to the preferred embodiment of the present invention.

Figure 9:
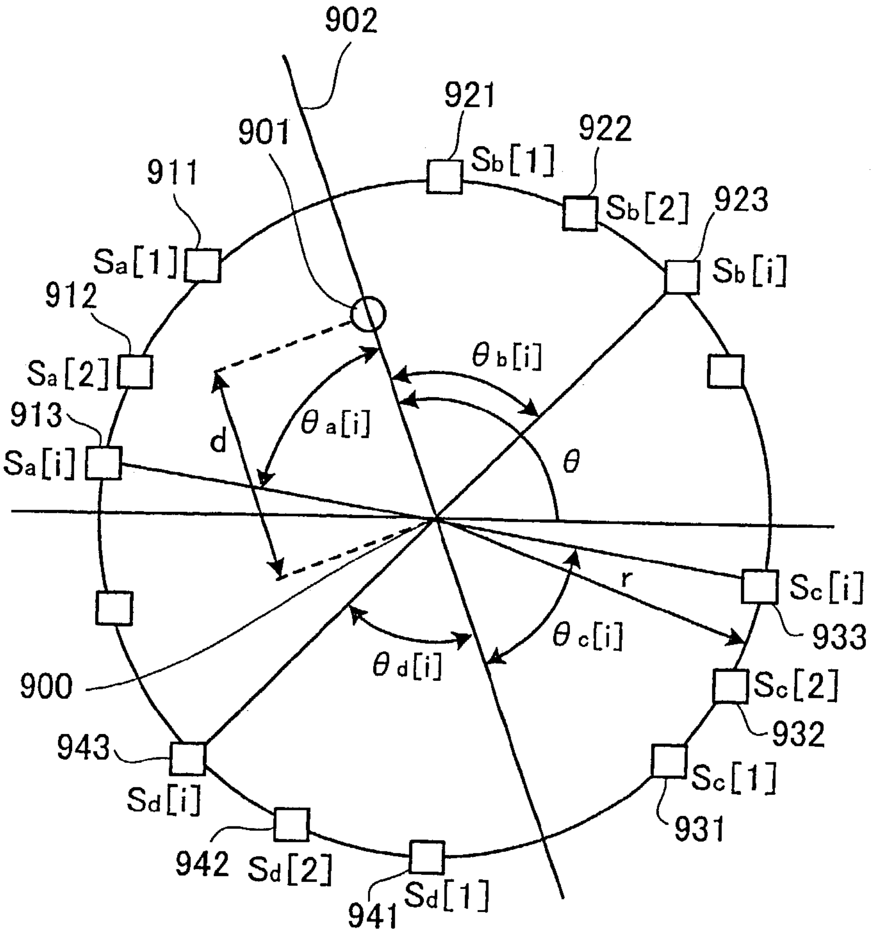
FIG. 9 is a plan view showing the loudspeakers forming part of the audio signal adjusting apparatus according to the preferred embodiment of the present invention, the loudspeakers being respectively disposed on a circumferential line of a predetermined circle in the specific sound space.

The baseline 902 extending to pass through the central location 900, as shown in FIG. 9, is firstly obtained by the signal level ratio producing unit (172) in response to the location information (d, θ) converted by the control signal converting unit (171).

The loudspeakers 911, 912, 913, 922, 923, 931, 932, 933, 941, 942, . . . , and 943 is then divided into two different groups consisting of first and second groups based on the baseline obtained by the signal level ratio producing unit (172), the first group including loudspeakers 911, 912, 913, 941, 942, . . . , and 943, the second group including loudspeakers 921, 922, 923, 931, 932, . . . , and 933.

The combination of the loudspeakers (Sa[1], Sb[1]), (Sa[2], Sb[2]), . . . , and (Sa[i], Sb[i]) are then respectively obtained by the signal level ratio producing unit (172) based on the first group and the second group. Similarly, the combination of the loudspeakers (Sc[1], Sd[1]), (Sc[2], Sd[2]), . . . , and (Sc[i], Sd[i]) are then respectively obtained by the signal level ratio producing unit (172) based on the first group and the second group.

The direction angle between the baseline 902 and the straight line connecting the central location 900 and the location of each of the loudspeakers 911, 912, 913, 922, 923, 931, 932, 933, 941, 942, . . . , and 943 is then obtained by the signal level ratio producing unit (172).

Here, the direction angles of the loudspeakers (Sa[1], Sb[1]), (Sa[2], Sb[2]), . . . , and (Sa[i], Sb[i]) are respectively represented by the legends (θa[1], θb[1]), (θa[2], θb[2]), . . . and (θa[i], θb[i]). Similarly, the direction angles of the loudspeakers (Sc[1], Sd[1]), (Sc[2], Sd[2]), . . . , and (Sc[i], Sd[i]) are respectively represented by the legends (θc[1], θd[1]), (θc[2], θd[2]), . . . and (θc[i], θd [i]).

Figure 10:
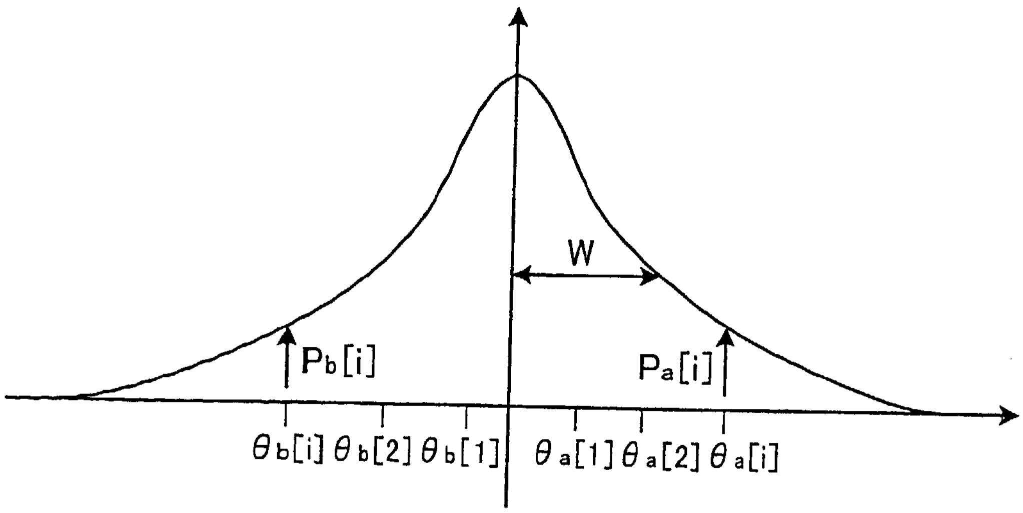
FIG. 10 is a schematic diagram showing the predetermined normal distribution function allowing the signal coefficients to be respectively produced by the signal level ratio producing unit forming part of the audio signal adjusting apparatus according to the preferred embodiment of the present invention.

The first signal coefficients (Pa[1], Pb[1]), (Pa[2], Pb[2]), . . . and (Pa[i], Pb[i]) are, as shown in FIG. 10, then respectively obtained by the signal level ratio producing unit (172) based on the direction angles (θa[1], θb[1]), (θa[2], θb[2]), . . . and (θa[i], θb[i]) and the predetermined normal distribution function. Similarly, the second signal coefficients (Pc[1], Pd[1]), (Pc[2], Pd[2]), . . . and (Pc[i], Pd[i]) are then respectively obtained by the signal level ratio producing unit (172) based on the direction angles (θc[1], θd[1]), (θc[2], θd[2]), . . . and (θc[i], θd [i]) and the predetermined normal distribution function.

The first total amount "Pab" of the first signal coefficients (Pa[1], Pb[1]), (Pa[2], Pb[2]), . . . and (Pa[i], Pb[i]) and the second total amount "Pcd" of the second signal coefficients (Pc[1], Pd[1]), (Pc[2], Pd[2]), . . . and (Pc[i], Pd[i]) are then respectively obtained by the signal level ratio producing unit (172), each of the first signal coefficients (Pa[1], Pb[1]), (Pa[2], Pb[2]), . . . and (Pa[i], Pb[i]) and each of the second signal coefficients (Pc[1], Pd[1]), (Pc[2], Pd[2]), . . . and (Pc[i], Pd[i]) are respectively adjusted by the signal level ratio producing unit (172) based on the equation 1 and the ratio of the first total amount "Pab" to the second total amount "Pcd".

$$Pab: Pcd = 1: (r_{max} - d)/r_{max} \qquad \text{(equation 1)}$$

Here, the legend "$r_{max}$" is indicative of the maximum value of the distance between the central location 900 and the location of each of the loudspeakers 911, 912, 913, 922, 923, 931, 932, 933, 941, 942, . . . , and 943, i.e., $r_{max}$=r under the condition that the loudspeakers 911, 912, 913, 922, 923, 931, 932, 933, 941, 942, . . . , and 943 are disposed on the circumferential line of the predetermined circle having the radius "r".

The signal coefficients are finally produced by the signal level ratio producing unit (172) under the condition that the total amount $v_{out}$ [decibel] of the power values of the adjusted audio signals is equal to the total amount $V_{in}$ [decibel] of the power values of the raw audio signals, i.e., the following equation 2.

$$V_{in} = \sum_{j=1}^{M} 10\wedge(v_{out}[j]/10) \quad \text{(equation 2)}$$

Here, the legend "M" is equal to the total number of the loudspeakers 911, 912, 913, 922, 923, 931, 932, 933, 941, 942, . . . , and 943.

Figure 11:
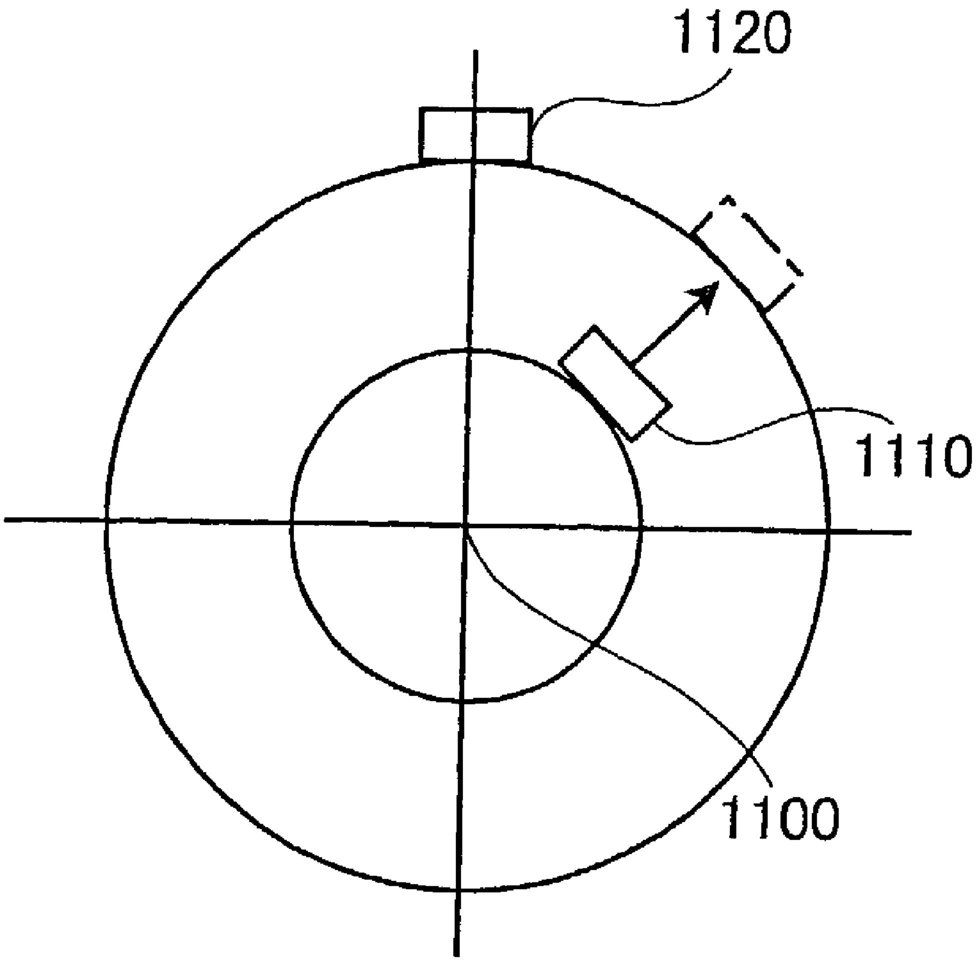
FIG. 11 is a plan view showing the loudspeakers forming part of the audio signal adjusting apparatus according to the preferred embodiment of the present invention, the loudspeakers being respectively disposed on a plurality of circumferential lines in the specific sound space.

If the loudspeaker 1100, as shown in FIG. 11, can not be disposed on the circumferential line of the predetermined circle having the radius "r", the delay time t[j] is obtained by the delay time information producing unit 173 by using the following equation 3 under the condition that the loudspeakers are respectively disposed on the circumferential line of the circle having the radius "$r_{max}$".

$$t[j]=(r_{max}-r[j])/v_0 \quad \text{(equation 3)}$$

Here, the legend "r[j]" is indicative of the distance between the central location 1100 and the location of the loudspeaker 1110, and the legend "$v_0$" is indicative of the sound velocity.

The following description will be directed to the step S006 performed by the audio signal adjusting apparatus 100 according to the preferred embodiment of the present invention.

Figure 12:
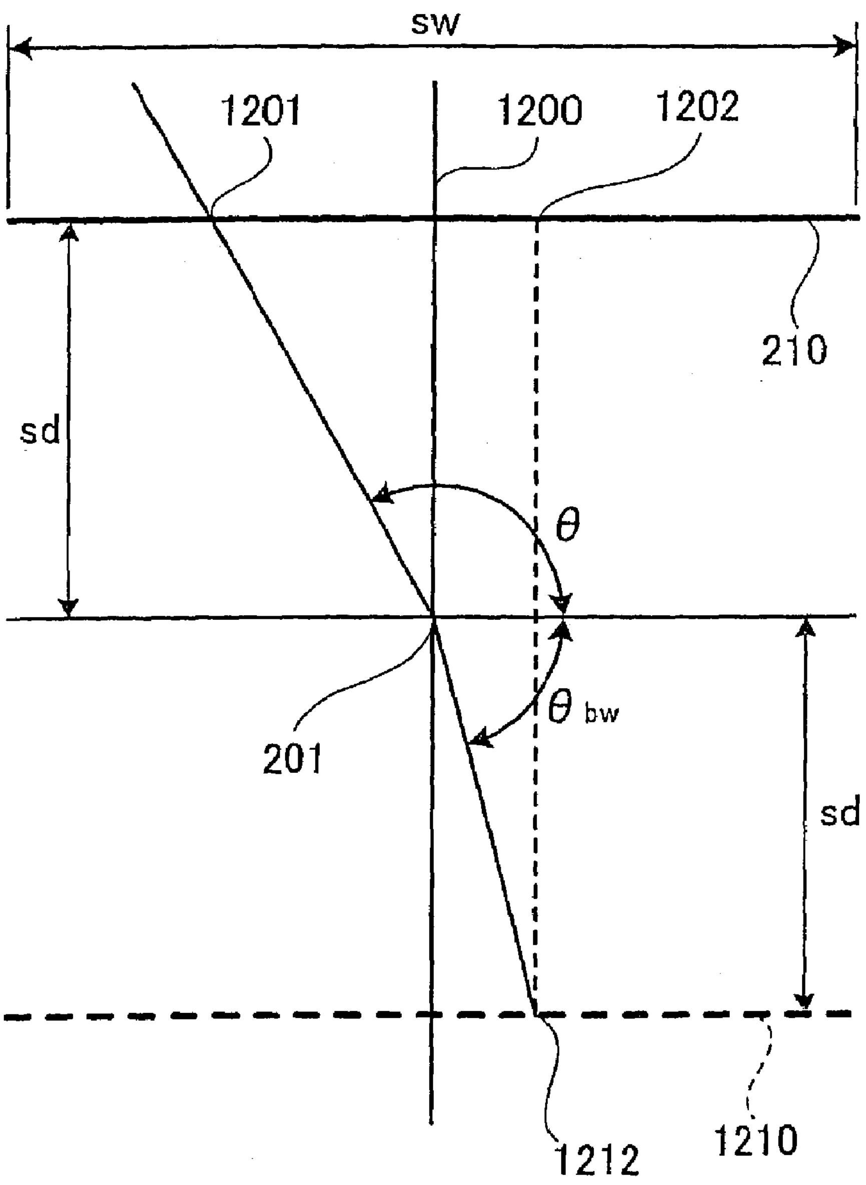
FIG. 12 is a schematic diagram showing the portion of the screen image on which the pointer image is superimposed by the superimposing means forming part of the audio signal adjusting apparatus according to the preferred embodiment of the present invention.

The portion of the screen image on which the pointer image is superimposed the superimposing means 141 is shown in FIG. 12. It is assumed that the screen 210 having a width "sw" is disposed at the location spaced apart from the central location 200 of the specific sound space.

The position 1201 in association with the location of the imaginary sound source is firstly calculated by the superimposing means 141 based on the location information (d, θ), the pointer image is then superimposed by the superimposing means 141 on the portion of the screen image to be displayed by the display means 142 based on the position 1201.

Figure 13:
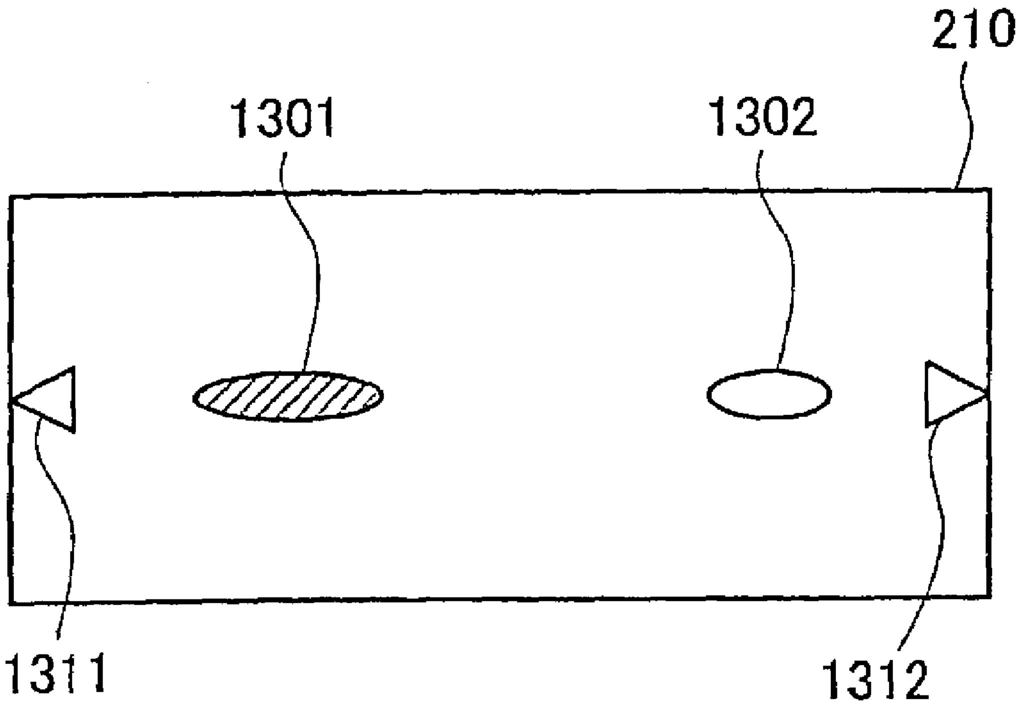
FIG. 13 is a schematic diagram showing the screen image on which the pointer image is superimposed by the superimposing means forming part of the audio signal adjusting apparatus according to the preferred embodiment of the present invention.

The width of the pointer image, as shown in FIG. 13, is obtained by the pointer image producing means 130 by multiplying the ratio of the distance "d" between the central location 201 and the location of the imaginary sound source to the distance between the central location 201 and the position 1201 by the width "w" of the imaginary sound source.

The following description will be directed to the first scale information produced by the first scale information producing means 161 forming part of the audio signal adjusting apparatus 100 according to the preferred embodiment of the present invention with no flowchart.

FIG. 14 is a schematic diagram showing the database with respect to the location information stored by the storing means forming part of the audio signal adjusting apparatus according to the preferred embodiment of the present invention.

Figure 15:
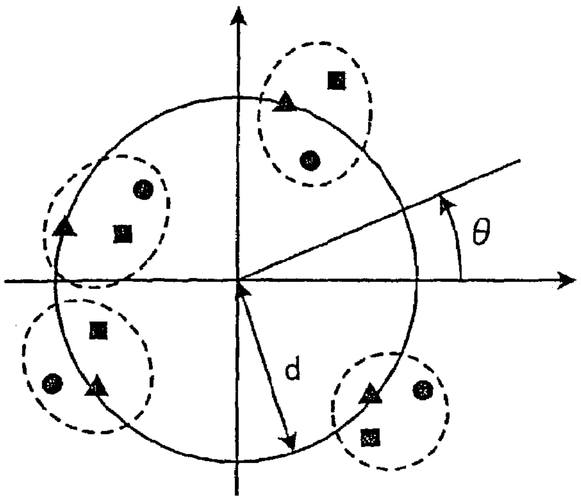
FIG. 15 is a schematic diagram showing the specific sound space in which the audio sounds are respectively produced by the loudspeakers each forming part of the audio signal adjusting apparatus according to the preferred embodiment of the present invention.

FIG. 15 is a schematic diagram showing the specific sound space in which the audio sounds are respectively produced by the loudspeakers each forming part of the audio signal adjusting apparatus according to the preferred embodiment of the present invention.

The location control signal indicative of the location ($d_0$, $\theta_0$)=($R_{max}$, 0) of the imaginary sound source is firstly produced by the location control signal producing means 151, the legend "$R_{max}$" being indicative of the remotest distance between the center position and the location "$d_0$" of the imaginary sound signal. The location control signal produced by the location control signal producing means 151 is then converted by the control signal converting unit 171 to the location information ($d_0$, $\theta_0$)=($R_{max}$, 0). The signal coefficients are then produced by the signal level ratio producing unit 172 in response to the location information ($d_0$, $\theta_0$)=($R_{max}$, 0), the phase differences being produced by the delay time information producing unit 173 in response to the location information ($d_0$, $\theta_0$)=($R_{max}$, 0).

The signal levels of the raw audio sounds are then respectively adjusted by the signal level adjusting unit 121 based on the signal coefficients produced by the signal level ratio producing unit 172, the raw phase angles of the raw audio sounds being respectively adjusted by the delay unit 122 based on the phase differences produced by the delay time information producing unit 173.

The pointer image is produced by the pointer image producing means 131 based on the location information ($R_{max}$, 0) converted by the control signal converting unit 171, and superimposed by the superimposing means 130 on the screen image.

The first scale information is then produced by the first scale information producing means 161. The location control signal is then converted by the control signal converting unit 171 to the location information ($d_1$, $\theta_1$) in response to the first scale information produced by the first scale information producing means 161.

The signal coefficients are then respectively produced by the signal level ratio producing unit 172 in response to the location information ($d_1$, $\theta_1$), the phase differences being respectively produced by the delay time information producing unit 173 in response to the location information ($d_1$, $\theta_1$).

The raw signal levels of the raw audio sounds are then respectively adjusted by the signal level adjusting unit 121 based on the signal coefficients produced by the signal level ratio producing unit 172, the phase angles of the raw audio sounds being respectively adjusted by the delay unit 121 based on the phase differences produced by the delay time information producing unit 173.

The first scale information is then produced by the first scale information producing means 161. The location control signal is then converted by the control signal converting unit 171 to the location information ($d_2$, $\theta_2$) in response to the first scale information produced by the first scale information producing means 161.

The pointer image is then produced by the pointer image producing unit 131 in response to the location information ($d_2$, $\theta_2$) converted by the control signal converting unit 171, and superimposed by the superimposing means 130 on the screen image to be displayed on the screen 210.

When the judgment is made by the judging means 163 that the location information ($d_0$, $\theta_0$), ($d_1$, $\theta_1$), and ($d_2$, $\theta_2$) is respectively stored by the storing means 180, the location information ($d_0$, $\theta_0$), ($d_1$, $\theta_1$), and ($d_2$, $\theta_2$) being finally stored by the storing means 180, the location information ($d_0$, $\theta_0$), ($d_1$, $\theta_1$), and ($d_2$, $\theta_2$) stored by the storing means 180, as shown in FIGS. 14 and 15, collectively constituting a database 1400 with respect to the location information ($d_0$, $\theta_0$), ($d_1$, $\theta_1$), and ($d_2$, $\theta_2$).

The location control signal is, practically, firstly produced by the location control signal producing means 151 while the location control signal is converted by the control signal converting unit 171 to the location information ($d_x$, $\theta_x$), the location information ($d_0$, $\theta_0$) being selected by the control signal converting unit 171 from the database with respect to the location information ($d_0$, $\theta_0$), ($d_1$, $\theta_1$), and ($d_2$, $\theta_2$) in response to the location information ($d_x$, $\theta_x$). The signal coefficients are then respectively produced by the signal level ratio producing unit 172 based on the location information ($d_1$, $\theta_1$) selected by the first scale information producing mean 161, the phase differences being respectively produced by the delay time information producing unit 173 based on the location information ($d_1$, $\theta_1$) selected by first scale information producing mean 171.

Figure 16:
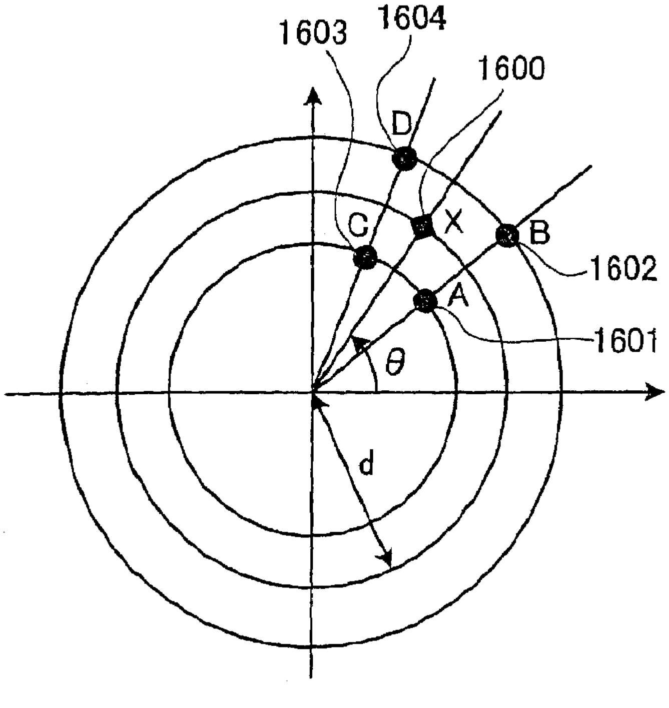
FIG. 16 is a schematic diagram showing the specific sound space in which the audio sounds are respectively produced by the loudspeakers each forming part of the audio signal adjusting apparatus according to the preferred embodiment of the present invention.

As shown in FIG. 16, practically, four locations "A", "B", "C", and "D" are respectively selected by the control signal converting means 171 from among the locations "A", "B", "C", "D", . . . , and "F" in association with the location information ($d_A$, $\theta_A$), ($d_B$, $\theta_B$), ($d_C$, $\theta_C$), ($d_D$, $\theta_D$), . . . , and ($d_F$, $\theta_F$) stored by the storing means 180.

FIG. 17 is a schematic diagram showing the database 1700 with respect to the location information stored by the storing means forming part of the audio signal adjusting apparatus according to the preferred embodiment of the present invention.

The location information ($d_1$, $\theta_1$) is ,as shown in FIG. 18, calculated by the control signal converting means 171 from the location information ($d_{1A}$, $\theta_{1A}$), ($d_{1B}$, $\theta_{1B}$), ($d_{1C}$, $\theta_{1C}$), and ($d_{1D}$, $\theta_{1D}$) stored by the storing means 180, the location information ($d_2$, $\theta_2$) being calculated by based on the location information ($d_{2A}$, $\theta_{2A}$), ($d_{2B}$, $\theta_{2B}$), ($d_{2C}$, $\theta_{2C}$), and ($d_{2D}$, $\theta_{2D}$) stored by the storing means 180.

The signal coefficients are finally respectively produced by the signal level ratio producing unit 172 based on the location information ($d_1$, $\theta_1$) calculated by the control signal converting means 171, the phase differences being respectively produced by the delay time information producing unit 173 based on the location information ($d_1$, $\theta_1$) calculated by the control signal converting means 171, the pointer image is produced by the pointer image producing unit 131 based on the location information ($d_1$, $\theta_1$).

The following description will be directed to the second scale information produced by the second scale information producing means 162 forming part of the audio signal adjusting apparatus 100 according to the preferred embodiment of the present invention with no flowchart.

The width control signal indicative of the width "w"="$w_{max}$" of the imaginary sound source is firstly produced by the width control signal producing means 152, the legend "$w_{max}$" being indicative of the maximum width of the imaginary sound source. The width control signal produced by the width control signal producing means 152 is then converted by the control signal converting unit 171 to the location information "w"="$w_{max}$". The signal coefficients are then respectively produced by the signal level ratio producing unit 172 in response to the width information "w"="$w_{max}$", the phase differences being respectively produced by the delay time information producing unit 173 in response to the width information "W"="$w_{max}$".

The raw signal levels of the raw audio sounds are then respectively adjusted by the signal level adjusting unit 121 based on the signal coefficients produced by the signal level ratio producing unit 172, the raw phase angles of the raw audio sounds being respectively adjusted by the delay unit 122 based on the phase differences produced by the delay time information producing unit 173.

The pointer image is produced by the pointer image producing means 131 based on the width information "w"="$w_{max}$" converted by the control signal converting unit 171, and superimposed by the superimposing means 130 on the screen image.

The second scale information is then produced by the second scale information producing means 162. The width control signal is then converted by the control signal converting unit 171 to the width information "w"="$w_1$" in response to the second scale information produced by the second scale information producing means 162.

The signal coefficients are then respectively produced by the signal level ratio producing unit 172 in response to the width information "w"="$w_1$", the phase differences being respectively produced by the delay time information producing unit 173 in response to the width information "w"="$w_1$".

The raw signal levels of the raw audio sounds are then respectively adjusted by the signal level adjusting unit 121 based on the signal coefficients produced by the signal level ratio producing unit 172, the phase angles of the raw audio sounds being respectively adjusted by the delay unit 121 based on the phase differences produced by the delay time information producing unit 173.

The second scale information is then produced by the second scale information producing means 162. The width control signal is then converted by the control signal converting unit 171 to the width information "$w_2$" in response to the second scale information produced by the second scale information producing means 162.

The pointer image is then produced by the pointer image producing unit 131 in response to the width information "$w_2$" converted by the control signal converting unit 171, and superimposed by the superimposing means 130 on the screen image to be displayed on the screen 210.

Figures 19, 20:
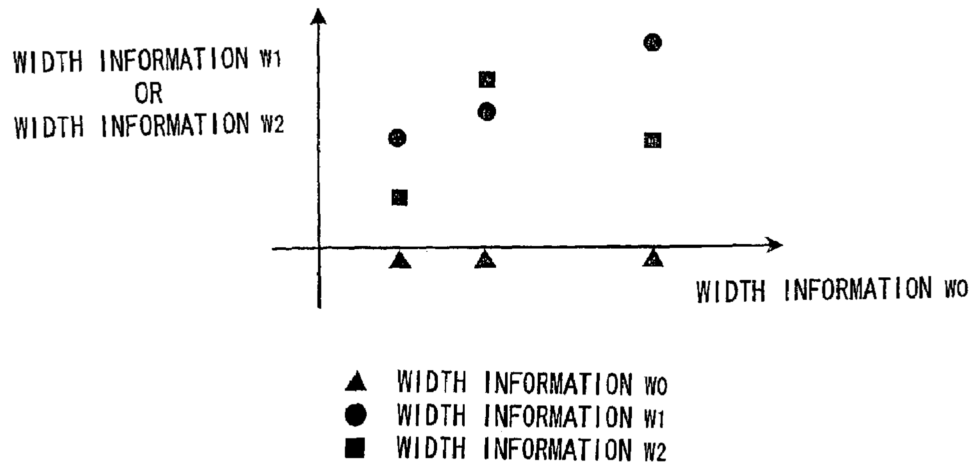
FIG. 19 is a schematic diagram showing the database with respect to the width information stored by the storing means forming part of the audio signal adjusting apparatus according to the preferred embodiment of the present invention.
FIG. 20 is a schematic diagram showing the width information which is produced by the control signal converting unit forming part of the audio signal adjusting apparatus according to the preferred embodiment of the present invention.

When the judgment is made by the judging means 163 that the width information "$w_0$", "$w_1$", and "$w_2$" is respectively stored by the storing means 180, the width information "$w_0$", "$w_1$", and "$w_2$" being finally stored by the storing means 180, the location information "$w_0$", "$w_1$", and "$w_2$" stored by the storing means 180, as shown in FIGS. 19 and 20, collectively constituting a database 1400 with respect to the location information "$w_0$", "$w_1$", and "$w_2$".

The width control signal is firstly produced by the width control signal producing means 152 while the width control signal is converted by the control signal converting unit 171 to the width information "$w_x$", the width information "$w_0$" being selected by the control signal converting unit 171 from the database with respect to the width information "$w_0$", "$w_1$", and "$w_2$" in response to the width information "$w_x$". The signal coefficients are then respectively produced by the signal level ratio producing unit 172 based on the width information "$w_1$" selected by the second scale information producing mean 172, the phase differences being respectively produced by the delay time information producing unit 173 based on the width information "$w_1$" selected by the second scale information producing mean 172.

Figures 21, 22:
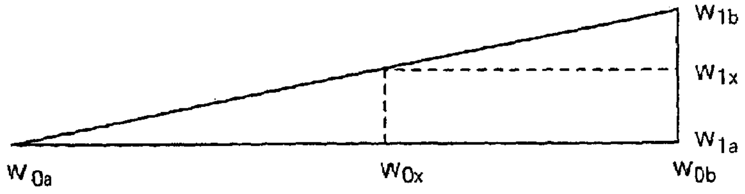
FIG. 21 is a schematic diagram showing the database with respect to the width information stored by the storing means forming part of the audio signal adjusting apparatus according to the preferred embodiment of the present invention.
FIG. 22 is a schematic diagram showing the width information which is produced by the control signal converting unit forming part of the audio signal adjusting apparatus according to the preferred embodiment of the present invention.

As shown in FIG. 21, practically, four locations "A", "B", "C", and "D" are respectively selected by the control signal converting means 171 from among the locations "A", "B", "C", "D", . . . , and "F" in association with the width information "$w_A$", "$w_B$", "$w_C$", "$w_D$", . . . , and "$w_F$" stored by the storing means 180.

FIG. 17 is a schematic diagram showing the database 1700 with respect to the width information stored by the storing means forming part of the audio signal adjusting apparatus according to the preferred embodiment of the present invention.

The width information "$w_1$" is, as shown in FIG. 22, calculated by the control signal converting means 171 from the width information "$w_A$", "$w_B$", "$w_C$", and "$w_D$" stored by the storing means 180, the width information "$w_2$" being calculated by based on the width information "$w_A$", "$w_B$", "$w_C$", and "$w_D$" stored by the storing means 180.

The signal coefficients are finally respectively produced by the signal level ratio producing unit 172 based on the width information "$w_1$" calculated by the control signal converting means 171, the phase differences being respectively produced by the delay time information producing unit 173 based on the width information "$w_1$" calculated by the control signal converting means 171, the pointer image is produced by the pointer image producing unit 131 based on the width information "$w_2$".

From the above detail description, it will be understood that the audio signal adjusting apparatus according to the preferred embodiment of the present invention can easily adjust the raw audio signals at a relatively high quality in response to the location control signal by the reason that the audio signal adjusting apparatus 100 comprises location control signal producing means 151 for producing the location control signal indicative of the location of the imaginary sound source; audio signal adjusting means 120 for adjusting each of the raw audio signals to produce the adjusted audio signal to be outputted to each of the loudspeakers; controlling means 170 for controlling the audio signal adjusting means 120 to allow each of the raw audio signals to be adjusted by the audio signal adjusting means 120 in response to the location control signal produced by the location control signal producing means 151, pointer image producing means 130 for producing a pointer image indicative of the location of the imaginary sound source; and superimposing means 141 for superimposing the pointer image produced by the pointer image producing means 130 on the portion of the screen image to be displayed by the display means 142 on the screen in response to the location control signal produced by the location control signal producing means 151. This leads to the fact that the audio sounds respectively produced by the loudspeakers are collectively originated from at least one imaginary sound source, the imaginary sound source being imagined to produce the audio sounds at a location requested by the operator.

The audio signal adjusting apparatus according to the preferred embodiment of the present invention can easily adjust the raw audio signals at a relatively high quality in response to the width control signal by the reason that the audio signal adjusting apparatus 100 further comprises width control signal producing means 152 for producing the width control signal indicative of the location of the imaginary sound source, the controlling means 170 being operative to control the audio signal adjusting means 120 to allow each of the raw audio signals to be adjusted by the audio signal adjusting means 120 in response to each of the location control signal produced by the location control signal producing means 151 and the width control signal produced by the width control signal producing means 152, pointer image producing means being operative to produce the pointer image having a shape indicative of the width of the imaginary sound source, the superimposing means 141 being operative to superimpose the pointer image produced by the pointer image producing means 130 on the portion of the screen image to be displayed by the display means 142 on the screen. This leads to the fact that the audio sounds respectively produced by the loudspeakers are collectively originated from at least one imaginary sound source, the imaginary sound source being imagined to produce the audio sounds at a location requested by the operator.

The audio signal adjusting apparatus according to the preferred embodiment of the present invention can easily adjust the raw audio signals at a relatively high quality in response to each of the location control signal and the width control signal by the reason that the audio signal adjusting apparatus 100 further comprises deciding means 153 for deciding whether or not the pointer image produced by the pointer image producing means 130 is superimposed by the superimposing means 141 on the portion of the screen image to be displayed by the display means 142 on the screen, the superimposing means 141 being operative to superimpose the pointer image produced by the pointer image producing means 130 on the portion of the screen image to be displayed by the display means 142 on the screen based on results decided by the deciding means 153. This leads to the fact that the audio sounds respectively produced by the loudspeakers are collectively originated from at least one imaginary sound source, the imaginary sound source being imagined to produce the audio sounds at a location requested by the operator.

The audio signal adjusting apparatus according to the preferred embodiment of the present invention can easily adjust the raw audio signals at a relatively high quality in response to each of the location control signal and the width control signal by the reason that the audio signal adjusting apparatus 100 further comprises audio signal recording means 191 operably connected with video signal recording means 192 having an operation timing to record the video signal produced by the video signal producing means 102, and designed to record the adjusted audio signals adjusted by the audio signal adjusting means 120 in synchronization with the operation timing of the video signal recording means 192.

The audio signal adjusting apparatus according to the preferred embodiment of the present invention can easily adjust the raw audio signals at a relatively high quality in response to each of the location control signal and the width control signal by the reason that the controlling means 170 includes an control signal converting unit 171 for respectively converting the location control signal produced by the location control signal producing means 151 and the width control signal produced by the width control signal producing means 152 to location information indicative of the location of the imaginary sound source and width information indicative of the width of the imaginary sound source, a signal level ratio producing unit 172 for producing a signal level ratio of each of the adjusted signal levels of the adjusted audio signals to each of the raw signal levels of the raw audio signals based on the location information and the width information converted by the control signal converting unit 171, and a delay time information producing unit 173 for producing a phase difference between each of the raw phase angles of the raw audio signals and each of the adjusted phase angles of the adjusted audio signals based on the location information and the width information converted by the control signal converting unit 171; and the audio signal adjusting means 120 includes a plurality of signal level adjusting unit 121 for respectively adjusting the raw signal levels of the raw audio signals based on the signal level ratio of each of the adjusted signal levels of the adjusted audio signals to each of the raw signal levels of the raw audio signals produced by the signal level ratio producing unit 172, and a plurality of delay unit 122 for respectively delaying the raw phase angle of the raw audio signals based on the phase difference between each of the raw phase angles of the raw audio signals and each of the adjusted phase angles of the adjusted audio signals produced by delay time information producing unit 173.

The audio signal adjusting apparatus according to the preferred embodiment of the present invention can easily adjust the raw audio signals at a relatively high quality in response to each of the location control signal and the width control signal by the reason that the audio signal adjusting apparatus 100 further comprises a chart image producing means 140 for producing a chart image indicative of the specific sound space having a predetermined central location and a first distance between the predetermined central location and the location of the imaginary sound source, the chart image having two different points consisting of first and second points, the first point being indicative of the predetermined central location of the specific sound space, the second point being indicative of the location of the imaginary sound source, a second distance between the first point and the second point, and in which the screen image to be displayed by the display means 142 on the screen has a predetermined portion, a marker indicative of the imaginary sound source, and the marker having a shape indicative of the width of the imaginary sound source, the superimposing means 141 being operative to superimpose the chart image produced by the chart image producing means 140 on the predetermined portion of the screen image to be displayed by the display means 142 on the screen.

The audio signal adjusting apparatus according to the preferred embodiment of the present invention can easily adjust the raw audio signals at a relatively high quality in response to each of the location control signal and the width control signal by the reason that the pointer image producing means 130 includes a pointer image producing unit 131 for producing the pointer image having a shape indicative of the width of the imaginary sound source and a pointer image modifying unit 132 for modifying the shape of the pointer image produced by the pointer image producing unit 131 in response to each of the location control signal produced by the location control signal producing means 151 and the width control signal produced by the width control signal producing means 152; and the superimposing means 141 is operative to superimpose the pointer image modified by the pointer image modifying unit 132 on the portion of the screen image to be displayed by the display means 142 on the screen 210.

The audio signal adjusting apparatus according to the preferred embodiment of the present invention can easily adjust the raw audio signals at a relatively high quality in response to each of the location control signal and the width control signal by the reason that the pointer image producing unit 131 is operative to produce the pointer image having a color in association with the location of the imaginary sound source; the pointer image modifying unit 132 is operative to modify the color of the pointer image produced by the pointer image producing unit 131 in response to the location control signal produced by the location control signal producing means 151; and the superimposing means 141 is operative to superimpose the pointer image modified by the pointer image modifying unit 132 on the portion of the screen image to be displayed by the display means 142 on the screen 210.

The audio signal adjusting apparatus according to the preferred embodiment of the present invention can easily adjust the raw audio signals at a relatively high quality in response to each of the location control signal and the width control signal by the reason that the audio signal adjusting apparatus 100 further comprises first scale information producing means 161 for producing a first scale information with respect to the second distance between the first point and second point; storing means 180 for storing the first scale information produced by the first scale information producing means 161; and judging means 163 for judging whether or not the first scale information produced by the first scale information producing means 161 are stored by the storing means 180, and in which the storing means 180 is operative to store the first scale information produced by the first scale information producing means 161 based on results judged by the judging means 163.

The audio signal adjusting apparatus according to the preferred embodiment of the present invention can easily adjust the raw audio signals at a relatively high quality in response to each of the location control signal and the width control signal by the reason that the audio signal adjusting apparatus 100 further comprises second scale information producing means 162 for producing a second scale information with respect to dimensions of the shape of the pointer image; and in which the storing means 180 is store each of the first scale information produced by the first scale information producing means 161 and the second scale information produced by the second scale information producing means 162, the judging means 163 is operative to judge whether or not each of the first scale information produced by the first scale information producing means 161 and the second scale information produced by the second scale information producing means 162 is stored by the storing means 180; and the storing means 180 is operative to store each of the first scale information produced by the first scale information producing means 161 and the second scale information produced by the second scale information producing means 162 based on results judged by the judging means 163.

The audio signal adjusting apparatus according to the preferred embodiment of the present invention can easily adjust the raw audio signals at a relatively high quality in response to each of the location control signal and the width control signal by the reason that the signal level ratio producing unit 172 is operative to produce the signal level ratio of each of the adjusted signal levels of the adjusted audio signals to each of the raw signal levels of the raw audio signals based on the location information converted by the control signal converting unit 171, the width information converted by the control signal converting unit 171, and each of the first scale information and the second scale information stored by the storing means 180; and the delay time information producing unit 173 is operative to produce the phase difference between each of the raw phase angles of the raw audio signals and each of the adjusted phase angles of the adjusted audio signals based on the location information converted by the control signal converting unit 171, the width information converted by the control signal converting unit 171, and each of the first scale information and the second scale information stored by the storing means 180.

The audio signal adjusting apparatus according to the preferred embodiment of the present invention can easily adjust the raw audio signals at a relatively high quality in response to each of the location control signal and the width control signal by the reason that the pointer image producing unit 131 is operative to produce the pointer image based on the location information converted by the control signal converting unit 171, the width information converted by the control signal converting unit 171, and each of the first scale information and the second scale information stored by the storing means 180; and the chart image producing means 140 is operative to produce the chart image based on the location information converted by the control signal converting unit 171, the width information converted by the control signal converting unit 171, and each of the first scale information and the second scale information stored by the storing means 180.

Although the location control signal producing means and the first scale information producing means are respectively constituted by the first joystick and the second joystick, each of the location control signal producing means and the first scale information producing means may be constituted by any pointing device. Although the width control signal producing means and the second scale information producing means are respectively constituted by the first controller and the second controller, each of the width control signal producing means and the second scale information producing means may be constituted by any input device.

While the subject invention has been described with relation to the preferred embodiments, various modifications and adaptations thereof will now be apparent to those skilled in the art as far as such modifications and adaptations fall within the scope of the appended claims intended to be covered thereby.

What is claimed is:

1. An audio signal adjusting apparatus for respectively adjusting a plurality of raw audio signals each having a raw signal level to produce a plurality of adjusted audio signals each having an adjusted signal level, comprising: audio signal adjusting means for respectively adjusting said raw audio signals to produce said adjusted audio signals, and to be operably connected with a plurality of loudspeakers for respectively producing a plurality of audio sounds in a specific sound space, said audio sounds being respectively indicative of said adjusted audio signals, and collectively originated from at least one imaginary sound source having a width, said imaginary sound source being imagined to produce said audio sounds at a location spaced apart from each of said loudspeakers; location control signal producing means for producing a location control signal indicative of said location of said imaginary sound source; controlling means for controlling said audio signal adjusting means to allow each of said raw audio signals to be adjusted by said audio signal adjusting means in response to said location control signal produced by said location control signal producing means; pointer image producing means for producing a pointer image indicative of said location of said imaginary sound source; and superimposing means to be operably connected with video signal producing means for producing a video signal having a screen image having a portion in association with said location of said imaginary sound source, designed to superimpose said pointer image produced by said pointer image producing means on said portion of said screen image after receiving said video signal from said video signal producing means in response to said location control signal produced by said location control signal producing means, and to be operably connected with display means having a screen to display said screen image on said screen after receiving said video signal from said superimposing means.

2. An audio signal adjusting apparatus as set forth in claim 1, which further comprises width control signal producing means for producing a width control signal indicative of said width of said imaginary sound source, and in which said controlling means is operative to control said audio signal adjusting means to allow each of said raw audio signals to be adjusted by said audio signal adjusting means in response to each of said location control signal produced by said location control signal producing means and said width control signal produced by said width control signal producing means.

3. An audio signal adjusting apparatus as set forth in claim 2, which further comprises deciding means for deciding whether or not said pointer image produced by said pointer image producing means is superimposed by said superimposing means on said portion of said screen image to be displayed by said display means on said screen, and in which said superimposing means is operative to superimpose said pointer image produced by said pointer image producing means on said portion of said screen image to be displayed by said display means on said screen based on results decided by said deciding means.

4. An audio signal adjusting apparatus as set forth in claim 3, which further comprises audio signal recording means operably connected with video signal recording means having an operation timing to record said video signal produced by said video signal producing means, and designed to record said adjusted audio signals adjusted by said audio signal adjusting means in synchronization with said operation timing of said video signal recording means.

5. An audio signal adjusting apparatus as set forth in claim 4, in which said controlling means includes a control signal converting unit for respectively converting said location control signal produced by said location control signal producing means and said width control signal produced by said width control signal producing means to location information indicative of said location of said imaginary sound source and width information indicative of said width of said imaginary sound source, a signal level ratio producing unit for producing a signal level ratio of each of said adjusted signal levels of said adjusted audio signals to each of said raw signal levels of said raw audio signals based on said location information and said width information converted by said control signal converting unit, and a delay time information producing unit for producing delay time information with respect to a delay time for each of said raw audio signals based on said location information and said width information received from said control signal converting unit; and said audio signal adjusting means includes a plurality of signal level adjusting unit for respectively adjusting said raw signal levels of said raw audio signals based on said signal level ratio of each of said adjusted signal levels of said adjusted audio signals to each of said raw signal levels of said raw audio signals produced by said signal level ratio producing unit, and a plurality of delay unit for respectively delaying said raw audio signals along a time axis in response to said delay time information produced by said delay time information producing unit.

6. An audio signal adjusting apparatus as set forth in claim 5, which further comprises a chart image producing means for producing a chart image indicative of said specific sound space having a predetermined central location and a first distance between said predetermined central location and said location of said imaginary sound source, said chart image having two different points consisting of first and second points, said first point being indicative of said predetermined central location of said specific sound space, said second point being indicative of said location of said imaginary sound source, and a second distance between said first point and said second point, and in which said screen image to be displayed by said display means on said screen has a predetermined portion, said superimposing means is operative to superimpose said chart image produced by said chart image producing means on said predetermined portion of said screen image to be displayed by said display means on said screen in response to said location control signal produced by said location control signal producing means.

7. An audio signal adjusting apparatus as set forth in claim 6, in which said chart image producing means is operative to produce said chart image having a marker indicative of said imaginary sound source, said marker having a shape indicative of said width of said imaginary sound source.

8. An audio signal adjusting apparatus as set forth in claim 7, in which said pointer image producing means includes a pointer image producing unit for producing said pointer image having a shape indicative of said width of said imaginary sound source and a pointer image modifying unit for modifying said shape of said pointer image produced by said pointer image producing unit in response to each of said location control signal produced by said location control signal producing means and said width control signal produced by said width control signal producing means; and said superimposing means is operative to superimpose said pointer image modified by said pointer image modifying unit on said portion of said screen image to be displayed by said display means on said screen.

9. An audio signal adjusting apparatus as set forth in claim 8, in which said pointer image producing unit is operative to produce said pointer image having a color in association with said location of said imaginary sound source; said pointer image modifying unit is operative to modify said color of said pointer image produced by said pointer image producing unit in response to said location control signal produced by said location control signal producing means; and said superimposing means is operative to superimpose said pointer image modified by said pointer image modifying unit on said portion of said screen image to be displayed by said display means on said screen.

10. An audio signal adjusting apparatus as set forth in claim 9, which further comprises first scale information producing means for producing a first scale information about an adjustment for said location control signal; storing means for storing said first scale information produced by said first scale information producing means; and judging means for judging whether or not said first scale information produced by said first scale information producing means are stored by said storing means, and in which said storing means is operative to store said first scale information produced by said first scale information producing means based on results judged by said judging means.

11. An audio signal adjusting apparatus as set forth in claim 10, which further comprises second scale information producing means for producing a second scale information about an adjustment for said width control signal; and in which said storing means is store each of said first scale information produced by said first scale information producing means and said second scale information produced by said second scale information producing means, said judging means is operative to judge whether or not each of said first scale information produced by said first scale information producing means and said second scale information produced by said second scale information producing means is stored by said storing means; and said storing means is operative to store each of said first scale information produced by said first scale information producing means and said second scale information produced by said second scale information producing means based on results judged by said judging means.

12. An audio signal adjusting apparatus as set forth in claim 11, in which said signal level ratio producing unit is operative to produce said signal level ratio of each of said adjusted signal levels of said adjusted audio signals to each of said raw signal levels of said raw audio signals based on said location information and said width information received from said control signal converting unit; and said delay time information producing unit is operative to produce said delay time information with respect to said delay time for each of said raw audio signals based on said location information and said width information received from said control signal converting unit.

13. An audio signal adjusting apparatus as set forth in claim 12, in which said pointer image producing unit is operative to produce said pointer image based on said location information converted by said control signal converting unit, said width information converted by said control signal converting unit, and each of said first scale information and said second scale information stored by said storing means; and said chart image producing means is operative to produce said chart image based on said location information converted by said control signal converting unit, said width information converted by said control signal converting unit, and each of said first scale information and said second scale information stored by said storing means.

14. An audio signal adjusting apparatus for respectively adjusting a plurality of raw audio signals each having a raw signal level to produce a plurality of adjusted audio signals each having an adjusted signal level, comprising: a plurality of loudspeakers for respectively producing a plurality of audio sounds in a specific sound space, said audio sounds being respectively indicative of said adjusted audio signals, and collectively originated from at least one imaginary sound source having a width, said imaginary sound source being imagined to produce said audio sounds at a location spaced apart from each of said loudspeakers; location control signal producing means for producing a location control signal indicative of said location of said imaginary sound source; audio signal adjusting means for respectively adjusting said raw audio signals to produce said adjusted audio signal to be outputted to each of said loudspeakers; controlling means for controlling said audio signal adjusting means to allow each of said raw audio signals to be adjusted by said audio signal adjusting means in response to said location control signal produced by said location control signal producing means; a video signal input terminal having a video signal in association with each of said raw audio signals inputted therein, said video signal having a screen image, said screen image having a portion in association with said location of said imaginary sound source; display means having a screen to display said screen image on said screen after receiving said video signal from said video signal input terminal; pointer image producing means for producing a pointer image indicative of said location of said imaginary sound source; and superimposing means for superimposing said pointer image produced by said pointer image producing means on said portion of said screen image to be displayed by said display means on said screen in response to said location control signal produced by said location control signal producing means.

15. An audio signal adjusting apparatus as set forth in claim 14, which further comprises width control signal producing means for producing a width control signal indicative of said width of said imaginary sound source, and in which said controlling means is operative to control said audio signal adjusting means to allow each of said raw audio signals to be adjusted by said audio signal adjusting means in response to each of said location control signal produced by said location control signal producing means and said width control signal produced by said width control signal producing means.

16. An audio signal adjusting apparatus as set forth in claim 15, which further comprises deciding means for deciding whether or not said pointer image produced by said pointer image producing means is superimposed by said superimposing means on said portion of said screen image to be displayed by said display means on said screen, and in which said superimposing means is operative to superimpose said pointer image produced by said pointer image producing means on said portion of said screen image to be displayed by said display means on said screen based on results decided by said deciding means.

17. An audio signal adjusting apparatus as set forth in claim 16, which further comprises audio signal recording means operably connected with video signal recording means having an operation timing to record said video signal received through said video signal input terminal, and designed to record said adjusted audio signals adjusted by said audio signal adjusting means in synchronization with said operation timing of said video signal recording means.

18. An audio signal adjusting apparatus as set forth in claim 17, in which said controlling means includes a control signal converting unit for respectively converting said location control signal produced by said location control signal producing means and said width control signal produced by said width control signal producing means to location information indicative of said location of said imaginary sound source and width information indicative of said width of said imaginary sound source, a signal level ratio producing unit for producing a signal level ratio of each of said adjusted signal levels of said adjusted audio signals to each of said raw signal levels of said raw audio signals based on said location information and said width information converted by said control signal converting unit, and a delay time information producing unit for producing delay time information with respect to a delay time for each of said raw audio signals based on said location information and said width information received from said control signal converting unit; and said audio signal adjusting means includes a plurality of signal level adjusting unit for respectively adjusting said raw signal levels of said raw audio signals based on said signal level ratio of each of said adjusted signal levels of said adjusted audio signals to each of said raw signal levels of said raw audio signals produced by said signal level ratio producing unit, and a plurality of delay unit for respectively delaying said raw audio signals along a time axis in response to said delay time information produced by said delay time information producing unit.

19. An audio signal adjusting apparatus as set forth in claim 18, which further comprises a chart image producing means for producing a chart image indicative of said specific sound space having a predetermined central location and a first distance between said predetermined central location and said location of said imaginary sound source, said chart image having two different points consisting of first and second points, said first point being indicative of said predetermined central location of said specific sound space, said second point being indicative of said location of said imaginary sound source, and a second distance between said first point and said second point, and in which said screen image to be displayed by said display means on said screen has a predetermined portion, said superimposing means is operative to superimpose said chart image produced by said chart image producing means on said predetermined portion of said screen image to be displayed by said display means on said screen in response to said location control signal produced by said location control signal producing means.

20. An audio signal adjusting apparatus as set forth in claim 19, in which said chart image producing means is operative to produce said chart image having a marker indicative of said imaginary sound source, said marker having a shape indicative of said width of said imaginary sound source.

21. An audio signal adjusting apparatus as set forth in claim 20, in which said pointer image producing means includes a pointer image producing unit for producing said pointer image having a shape indicative of said width of said imaginary sound source and a pointer image modifying unit for modifying said shape of said pointer image produced by said pointer image producing unit in response to each of said location control signal produced by said location control signal producing means and said width control signal produced by said width control signal producing means; and said superimposing means is operative to superimpose said pointer image modified by said pointer image modifying unit on said portion of said screen image to be displayed by said display means on said screen.

22. An audio signal adjusting apparatus as set forth in claim 21, in which said pointer image producing unit is operative to produce said pointer image having a color in association with said location of said imaginary sound source; said pointer image modifying unit is operative to modify said color of said pointer image produced by said pointer image producing unit in response to said location control signal produced by said location control signal producing means; and said superimposing means is operative to superimpose said pointer image modified by said pointer image modifying unit on said portion of said screen image to be displayed by said display means on said screen.

23. An audio signal adjusting apparatus as set forth in claim 22, which further comprises first scale information producing means for producing a first scale information about an adjustment for said location control signal; storing means for storing said first scale information produced by said first scale information producing means; and judging means for judging whether or not said first scale information produced by said first scale information producing means are stored by said storing means, and in which said storing means is operative to store said first scale information produced by said first scale information producing means based on results judged by said judging means.

24. An audio signal adjusting apparatus as set forth in claim 23, which further comprises second scale information producing means for producing a second scale information about an adjustment for said width control signal; and in which said storing means is store each of said first scale information produced by said first scale information producing means and said second scale information produced by said second scale information producing means, said judging means is operative to judge whether or not each of said first scale information produced by said first scale information producing means and said second scale information produced by said second scale information producing means is stored by said storing means; and said storing means is operative to store each of said first scale information produced by said first scale information producing means and said second scale information produced by said second scale information producing means based on results judged by said judging means.

25. An audio signal adjusting apparatus as set forth in claim 24, in which said signal level ratio producing unit is operative to produce said signal level ratio of each of said adjusted signal levels of said adjusted audio signals to each of said raw signal levels of said raw audio signals based on said location information and said width information received from said control signal converting unit; and said delay time information producing unit is operative to produce said delay time information with respect to said delay time for each of said raw audio signals based on said location information and said width information received from said control signal converting unit.

26. An audio signal adjusting apparatus as set forth in claim 25, in which said pointer image producing unit is operative to produce said pointer image based on said location information converted by said control signal converting unit, said width information converted by said control signal converting unit, and each of said first scale information and said second scale information stored by said storing means; and said chart image producing means is operative to produce said chart image based on said location information converted by said control signal converting unit, said width information converted by said control signal converting unit, and each of said first scale information and said second scale information stored by said storing means.

27. An audio signal adjusting apparatus as set forth in claim 23, in which said first scale information producing means is constituted by a first joystick unit having a first joystick and an first operation surface, said first joystick having a first central axis and a first central point located on said first central axis, and said first joystick being pivotable around said first central axis at a variable inclination angle between said first central axis and said first operation surface in association with first scale information, and said first joystick unit being operative to produce said first scale information in response to said inclination angle; said location control signal producing means is constituted by a second joystick unit having a second joystick and an second operation surface, said second joystick having a second central axis and a second central point located on said second central axis, and said second joystick being pivotable around said second central axis at a variable inclination angle between said second central axis and said second operation surface in association with said location of said imaginary sound source, and said first joystick unit being operative to produce said location control signal in response to response to said inclination angle; said pointer image producing means is operative to produce said pointer image through steps of producing said pointer image in response to said location control signal produced by said first joystick unit, and adjusting said pointer image in response to said first scale information produced by said first joystick unit when said first scale information is produced by said first joystick unit under the condition that said second joystick of said second joystick unit is disposed at a first predetermined inclination angle; and said audio signal adjusting means is operative to adjust each of said raw audio signals to produce said adjusted audio signal to be outputted to each of said loudspeakers in response to each of said first scale information produced by said first joystick unit and said location control signal produced by said second joystick unit when said first scale information is produced by said first joystick unit under the condition that said second joystick of said second joystick unit is disposed at a second predetermined inclination angle.

28. An audio signal adjusting apparatus as set forth in claim 24, in which; said width control signal producing means is constituted by a first potentiometer having a first rotatable central axis, said first potentiometer is operative to produce said width control signal varied in response to a rotation angle of said first central axis; said second scale information producing means is constituted by a second potentiometer having a second rotatable central axis, said second potentiometer is operative to produce said second scale information varied in response to a rotation angle of said second central axis; said pointer image producing means is operative to produce said pointer image through steps of producing said pointer image in response to said width control signal produced by said first potentiometer, and adjusting said pointer image in response to said second scale information produced by said second potentiometer when said second scale information is produced by said second potentiometer unit under the condition that said first central axis of said first potentiometer is disposed at a first predetermined rotation angle; and said audio signal adjusting means is operative to adjust each of said raw audio signals to produce said adjusted audio signal to be outputted to each of said loudspeakers in response to said second scale information produced by said second potentiometer when said second scale information is produced by said second potentiometer under the condition that said first central axis of said first potentiometer is disposed at a second predetermined rotation angle.

* * * * *